(12) United States Patent
Wu et al.

(10) Patent No.: US 8,948,397 B2
(45) Date of Patent: Feb. 3, 2015

(54) MAJOR MANAGEMENT APPARATUS, AUTHORIZED MANAGEMENT APPARATUS, ELECTRONIC APPARATUS FOR DELEGATED KEY MANAGEMENT, AND KEY MANAGEMENT METHODS THEREOF

(71) Applicant: Institute for Information Industry, Taipei (TW)

(72) Inventors: Jui-Ming Wu, New Taipei (TW); You-Lian Huang, Taoyuan (TW); Chih-Chiang Hsieh, Taipei (TW); Emery Jou, Taipei (TW)

(73) Assignee: Institute For Information Industry, Taipei (TW)

( * ) Notice: Subject to any disclaimer, the term of this patent is extended or adjusted under 35 U.S.C. 154(b) by 10 days.

(21) Appl. No.: 13/714,342

(22) Filed: Dec. 13, 2012

(65) Prior Publication Data
US 2014/0161260 A1    Jun. 12, 2014

(30) Foreign Application Priority Data

Dec. 6, 2012    (TW) .............................. 101145820 A

(51) Int. Cl.
*H04L 9/08*        (2006.01)
*G06F 21/31*       (2013.01)
*G06F 21/34*       (2013.01)

(52) U.S. Cl.
CPC ....................................... *H04L 9/08* (2013.01)
USPC ........... 380/278; 380/277; 380/281; 713/150; 713/171; 713/189; 726/2; 726/4; 726/9; 726/26

(58) Field of Classification Search
CPC ............ H04W 12/04; H04W 36/0011; H04L 9/3236; H04L 63/12; H04L 63/061; H04L 63/062; H04L 9/30; H04N 21/632; H04N 21/4627; G11B 20/0021; G11B 20/00731
USPC .......... 380/277–279, 281; 713/150, 171, 189; 726/2, 4, 9, 26–30
See application file for complete search history.

(56) References Cited

U.S. PATENT DOCUMENTS

| | | | |
|---|---|---|---|
| 2003/0061477 A1* | 3/2003 | Kahn et al. ..................... | 713/150 |
| 2005/0114666 A1* | 5/2005 | Sudia ............................. | 713/175 |

(Continued)

OTHER PUBLICATIONS

Wallner et al. "Key Management for Multicast: Issues and Architectures," Jun. 1999, RFC2627, The Internet Society (1999), pp. 1-25.*

*Primary Examiner* — Michael Chao
*Assistant Examiner* — Shiuh-Huei Ku
(74) *Attorney, Agent, or Firm* — Skaar Ulbrich Macari, P.A.

(57) ABSTRACT

A major management apparatus, an authorized management apparatus, an electronic apparatus for delegated key management and key management methods thereof are provided. The major management apparatus generates a first delegation deployment message and a second delegation deployment message, which are transmitted to the authorized management apparatus and the electronic apparatus, respectively. The authorized management apparatus encrypts an original key management message into a key management message by an authorization key included in the first delegation deployment message. The original key management message includes an operation code and a key identity. The electronic apparatus decrypts the key management message into the original key management message by the authorization key included in the second delegation deployment message. The electronic apparatus selects an application key according to the key identity and operates the application key based on the operation code.

40 Claims, 21 Drawing Sheets

(56) References Cited

U.S. PATENT DOCUMENTS

2011/0058405 A1 3/2011 Chen et al.
2011/0158405 A1 6/2011 Choi et al.
2011/0271110 A1 11/2011 Ohba et al.
2013/0041828 A1* 2/2013 Gonzalez et al. ............... 705/51

* cited by examiner

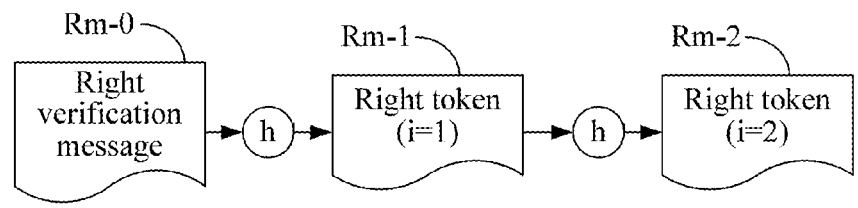
FIG. 5A
| i | SKm-1 | SKm-2 | SKm-3 | ...... | SKm-j |
|---|---|---|---|---|---|
| 1 | Op-1<br>Op-2 | Op-1<br>Op-2<br>Op-3 | Op-1<br>Op-2<br>Op-3 | | Op-1<br>Op-2<br>Op-3<br>Op-4 |
| 2 | Op-1 | Op-1 | Op-1 | | Op-1 |
FIG. 5B
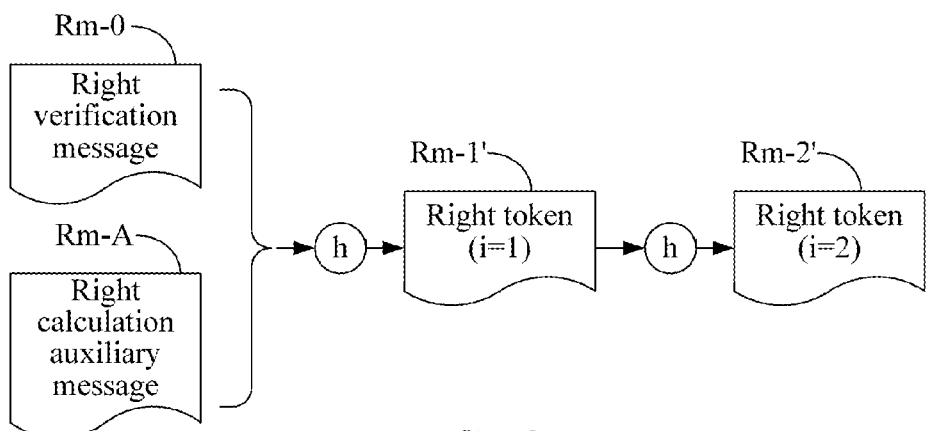
FIG. 6

MAJOR MANAGEMENT APPARATUS, AUTHORIZED MANAGEMENT APPARATUS, ELECTRONIC APPARATUS FOR DELEGATED KEY MANAGEMENT, AND KEY MANAGEMENT METHODS THEREOF

PRIORITY

This application claims priority to Taiwan Patent Application No. 101145820 filed on Dec. 6, 2012, the entirety of which is hereby incorporated by reference herein.

FIELD

The present invention relates to a major management apparatus, an authorized management apparatus, an electronic apparatus, and key management methods thereof. More particularly, the present invention relates to a major management apparatus, an authorized management apparatus, an electronic apparatus, and key management methods thereof that adopt a delegating key management mechanism.

BACKGROUND

The network technologies have been developed for many years. FIG. 1 depicts a schematic view of a conventional network system 1. The network system 1 comprises a server 11, a plurality of gateways 13, and a plurality of electronic apparatuses 15. The server 11 connects to the gateways 13 via the Internet and manages the electronic apparatuses 15 via the gateways 13. In recent years, this architecture of the network system 1 is often used in Internet of Things (IoT) systems, such as Advanced Metering Infrastructure (AMI) systems. When the network system 1 is an AMI system, the server 11 may be a meter data management system (MDMS), each of the gateways 13 may be a concentrator, and each of the electronic apparatuses 15 may be a smart meter.

When the network system 1 is an IOT system, the server 11 needs to access information from the electronic apparatuses 15 (e.g., read parameters of the smart meters, set the parameters of the smart meters, and so on) frequently. For purpose of information security, the network system 1 often employs a cryptography algorithm to encrypt/decrypt the transmitted/received information or messages and deal with the security control. By doing so, security protections in terms of confidentiality, integrity, authentication, and access control can be achieved. Therefore, the server 11, the gateways 13, and the electronic apparatuses 15 must all be provided with security keys.

To cater for the diversified needs for security protection in application systems, the electronic apparatuses 15 has to establish and maintain a plurality of security keys for most of the time. These security keys may be keys for a symmetric cryptography algorithm or keys for an asymmetric cryptography algorithm. Management of the keys must be carried out via a network through interaction between the electronic apparatuses 15 and an external key management system (e.g., the server 11). Management of the keys is very complex and involves the following four main operations.

The first main operation is the key establishment, in which a key is generated by the key management system and transmitted to an electronic apparatus 15 or a key is generated through information exchange between the key management system and the electronic apparatus 15 by a specific key negotiation mechanism (e.g., the Diffie-Hellman key exchange protocol). The second main operation is re-key, in which a new key for replacing the original key is generated and transmitted by the key management system or is generated through negotiation between two parties. The third main operation is key suspend/restore, in which a suspension command is transmitted from the key management system to the electronic apparatus 15 to suspend the original key or a restoration command is transmitted from the key management system to the electronic apparatus 15 to restore the suspended key. The fourth main operation is key revocation, in which a revocation command is transmitted from the key management system to the electronic apparatus 15 to disable the original key forever.

For security sensitive applications (e.g., AMI systems), the server 11 often takes charge of the life cycle management of the electronic apparatuses 15, including device authentication and management of connection with the system in the installation stage, maintenance management in the running stage, and device removal or replacement in the aged stage. These also include key management on the electronic apparatuses 15.

Since the network system 1 is often of a very large scale, the number of the electronic apparatuses 15 is huge (e.g., in an AMI system, the number of the smart meters and gateways are usually on the order of millions) and the key management operations are very complex. When the keys are managed in the aforesaid centralized way (i.e., all the electronic apparatuses 15 are managed by the server 11 directly), a poor efficiency is often caused. Specifically, the key management of the centralized way has the problems of having a too-long transmission path of the management information, a too-long transmission time, and an excessive amount of network information traffic. In addition, since the server 11 has to manage the individual electronic apparatuses 15 one by one, the workload of the server 11 is huge and the overall operation time is too long, which become the bottleneck of the network system 1. Accordingly, a key management mechanism that can solve the aforesaid problems is in an urgent need.

SUMMARY

To solve the aforesaid problems, the present invention provides a major management apparatus, an authorized management apparatus, an electronic apparatus for delegated key management and key management methods thereof.

The major management apparatus for delegated key management of certain embodiments of the present invention can be used in a network system, wherein the network system comprises the major management apparatus, an authorized management apparatus, and an electronic apparatus. The major management apparatus comprises a storage unit, a transceiving interface, and a processing unit electrically connected to the storage unit and the transceiving interface. The storage unit is configured to store a first device key and a second device key. The transceiving interface is configured to transmit the first device key to the authorized management apparatus and transmit the second device key to the electronic apparatus. The processing unit is configured to encrypt a first original delegation deployment message into a first delegation deployment message by the first device key and encrypt a second original delegation deployment message into a second delegation deployment message by the second device key. The first original delegation deployment message comprises an authorization key, while the second original delegation deployment message comprises the authorization key. The transceiving interface further transmits the first delegation deployment message to the authorized management apparatus so that the authorized management apparatus encrypts an original key management message into a key management message by the authorization key. The transceiving interface further transmits the second delegation deployment message to the electronic apparatus so that the electronic apparatus decrypts the key management message received from the authorized management apparatus into the original key management message by the authorization key and operates an application key according to the original key management message.

The authorized management apparatus for delegated key management of certain embodiments of the present invention can be used in a network system, wherein the network system comprises the authorized management apparatus, a major management apparatus, and an electronic apparatus. The authorized management apparatus comprises a first transceiving interface, a storage unit, a processing unit, and a second transceiving interface, wherein the processing unit is electrically connected to the first transceiving interface, the storage unit, and the second transceiving interface. The first transceiving interface is configured to receive a device key and a delegation deployment message from the major management apparatus. The storage unit is configured to store the device key. The processing unit is configured to decrypt the delegation deployment message into an original delegation deployment message by the device key and encrypt an original key management message into a key management message by an authorization key comprised in the original delegation deployment message. The original key management message comprises an operation code and a key identity. The second transceiving interface is configured to transmit the key management message to the electronic apparatus so that the electronic apparatus selects an application key according to the key identity and applies an operation corresponding to the operation code to the application key.

The electronic apparatus of certain embodiments of the present invention can be used in a network system, wherein the network system comprises the electronic apparatus, a major management apparatus, and an authorized management apparatus. The electronic apparatus comprises a storage unit, a transceiving interface, and a processing unit electrically connected to the storage unit and the transceiving interface. The storage unit is configured to store an application key. The transceiving interface is configured to receive a device key and a delegation deployment message from the major management apparatus. The processing unit is configured to decrypt the delegation deployment message into an original delegation deployment message by the device key. The storage unit further stores the device key. The transceiving interface further receives a key management message from the authorized management apparatus. The processing unit further decrypts the key management message into an original key management message by an authorization key comprised in the original delegation deployment message, wherein the original key management message comprises an operation code and a key identity. The processing unit further selects the application key according to the key identity and applies an operation corresponding to the operation code to the application key.

The key management method of certain embodiments of the present invention is for use in a major management apparatus, wherein a network system comprises the major management apparatus, an authorized management apparatus, and an electronic apparatus. The key management method comprises the steps of: (a) transmitting a first device key to the authorized management apparatus, (b) transmitting a second device key to the electronic apparatus, (c) encrypting a first original delegation deployment message into a first delegation deployment message by the first device key, wherein the first original delegation deployment message comprises an authorization key, (d) encrypting a second original delegation deployment message into a second delegation deployment message by the second device key, wherein the second original delegation deployment message comprises the authorization key;, (e) transmitting the first delegation deployment message to the authorized management apparatus so that the authorized management apparatus encrypts an original key management message into a key management message by the authorization key, and (f) transmitting the second delegation deployment message to the electronic apparatus so that the electronic apparatus decrypts the key management message received from the authorized management apparatus into the original key management message by the authorization key and operates an application key according to the original key management message.

The key management method of certain embodiments of the present invention is for use in an authorized management apparatus, wherein a network system comprises the authorized management apparatus, a major management apparatus, and an electronic apparatus. The key management method comprises the steps of: (a) receiving a device key from the major management apparatus, (b) receiving a delegation deployment message from the major management apparatus, (c) decrypting the delegation deployment message into an original delegation deployment message by the device key, (d) encrypting an original key management message into a key management message by an authorization key comprised in the original delegation deployment message, wherein the original key management message comprises an operation code and a key identity, and (e) transmitting the key management message to the electronic apparatus so that the electronic apparatus selects an application key according to the key identity and applies an operation corresponding to the operation code to the application key.

The key management method of certain embodiments of the present invention is for use in an electronic apparatus, wherein a network system comprises the electronic apparatus, a major management apparatus, and an authorized management apparatus. The electronic apparatus stores an application key. The key management method comprises the steps of: (a) receiving a device key from the major management apparatus, (b) receiving a delegation deployment message from the major management apparatus, (c) decrypting the delegation deployment message into an original delegation deployment message by the device key, (d) receiving a key management message from the authorized management apparatus, (e) decrypting the key management message into an original key management message by an authorization key comprised in the original delegation deployment message, wherein the original key management message comprises an operation code and a key identity, (f) selecting the application key according to the key identity, and (g) applying an operation corresponding to the operation code to the application key.

According to certain embodiments of the present invention, managements of the application key of the electronic apparatus are delegated by the major management apparatus to the authorized management apparatus. The major management apparatus transmits the delegation deployment messages to the authorized management apparatus and the electronic apparatus so that the authorized management apparatus and the electronic apparatus can manage the application key by information comprised in the delegation deployment message. Through the delegating mechanism, the present invention can solve the problems encountered by the prior art in key management including a too-long information transmission path, a too-large network data traffic, and a too-heavy workload of the major management apparatus.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 5A depicts a schematic view of the relationships between a right verification message Rm-0, right levels, and right tokens Rm-1, Rm-2 according to a third embodiment;

FIG. 5B depicts a schematic view of an access right message 5;

FIG. 6 depicts a schematic view of the relationships between a right verification message Rm-0, a right calculation auxiliary message, right levels, and right tokens Rm-1', Rm-2' according to a fourth embodiment;

DETAILED DESCRIPTION

In the following descriptions, a major management apparatus, an authorized management apparatus, an electronic apparatus, and key management methods thereof according to the present invention will be explained with reference to example embodiments thereof. However, these example embodiments are not intended to limit the present invention to any specific example, embodiment, environments, applications or implementations described in these embodiments. Therefore, description of these embodiments is only for purpose of illustration rather than to limit the present invention. It shall be appreciated that, in the following embodiments and the attached drawings, elements not directly related to the present invention are omitted from depiction.

Figure 1:
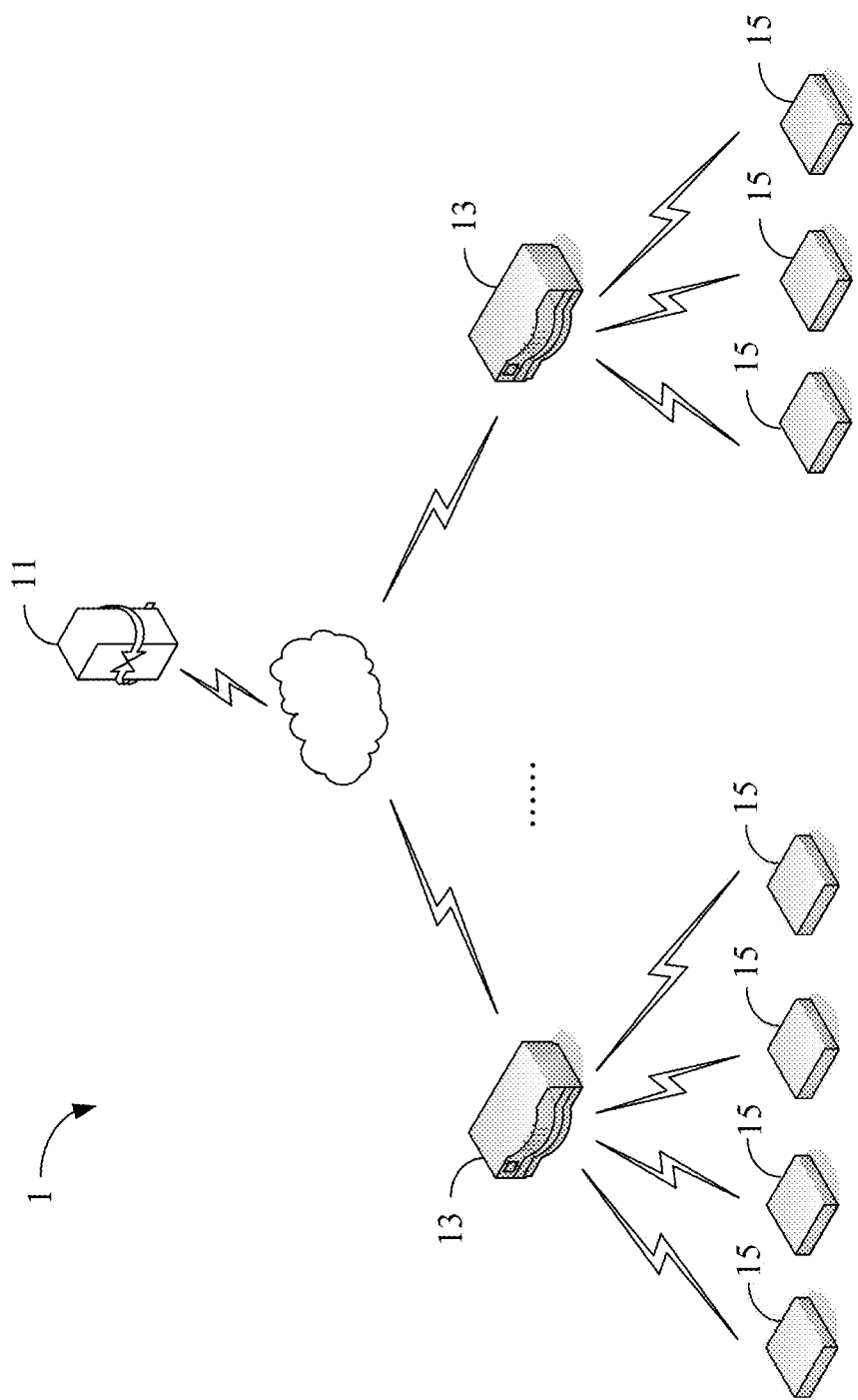
FIG. 1 depicts a schematic architecture of a conventional network system.
Figure 2:
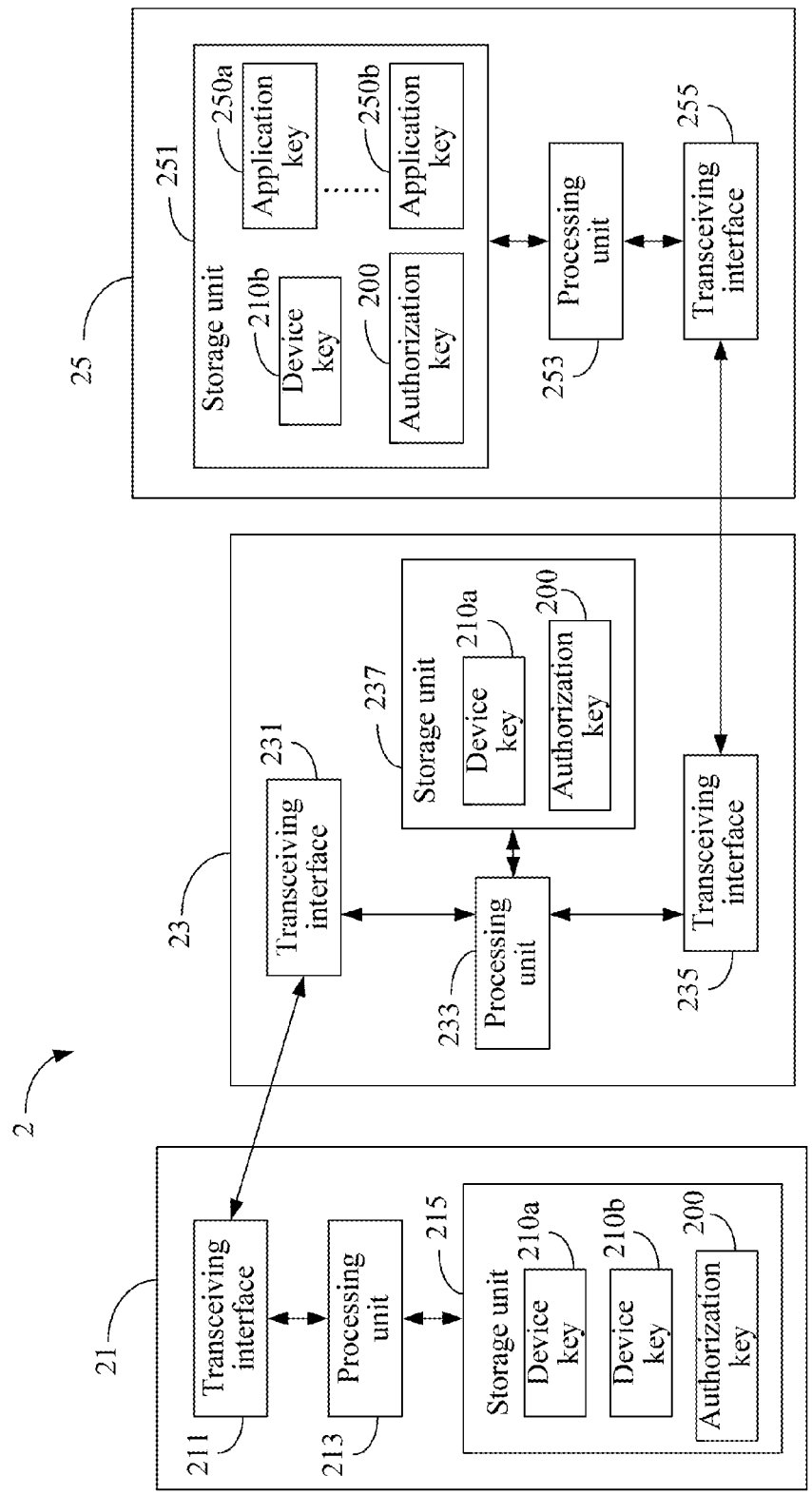
FIG. 2 depicts a schematic view of a network system 2 according to a first embodiment.
Figures 3, 4:
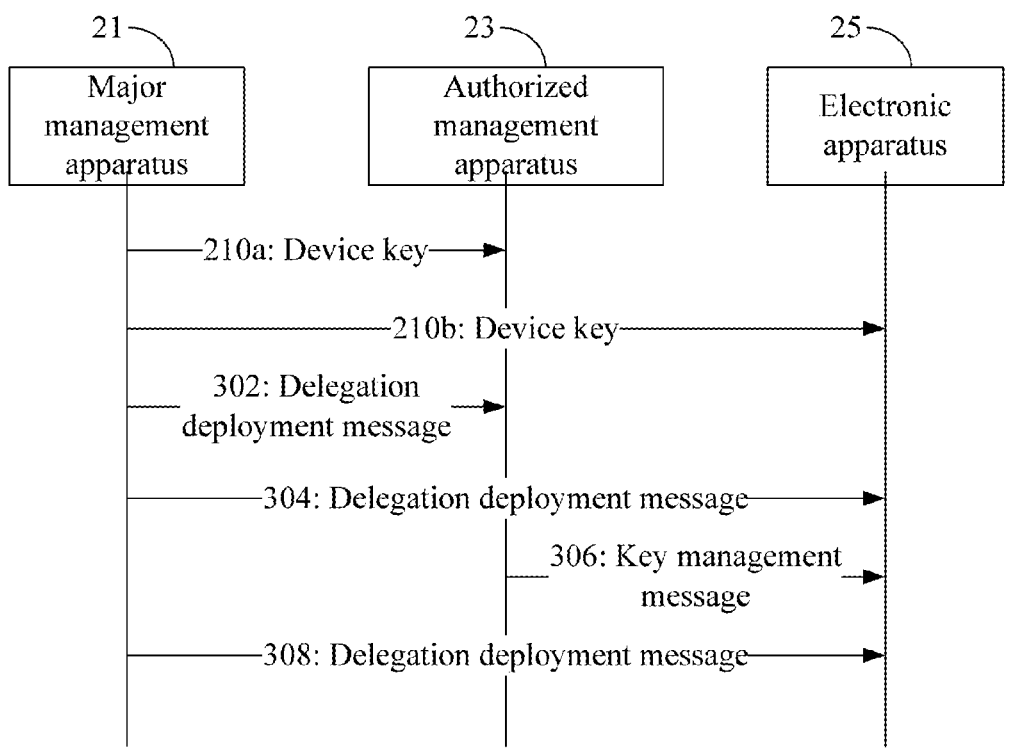
FIG. 3 depicts a schematic view of signal transmissions according to the first embodiment.
FIG. 4 depicts a schematic view of an access right message 4 according to a second embodiment.

FIG. 2 depicts a schematic view of a network system 2 according to a first embodiment, while FIG. 3 depicts a schematic view of signal transmissions according to the first embodiment. The network system 2 comprises a major management apparatus 21, an authorized management apparatus 23, and a plurality of electronic apparatuses 25. Since the operations of the electronic apparatuses 25 are all the same, only one of the electronic apparatuses 25 is depicted in FIG. 2 and the following description will focus on only one of the electronic apparatuses 25.

The network system 2 may be an Internet of Things (IoT) system, such as an Advanced Metering Infrastructure (AMI) system. When the network system 2 is an AMI system, the major management apparatus 21 may be a head end system or a meter data management system (MDMS), the authorized management apparatus 23 may be a concentrator or a gateway, and each of the electronic apparatuses 25 may be a terminal device or a smart meter.

The major management apparatus 21 comprises a transceiving interface 211, a processing unit 213, and a storage unit 215, wherein the processing unit 213 is electrically connected to the transceiving interface 211 and the storage unit 215. The authorized management apparatus 23 comprises two transceiving interfaces 231, 235, a processing unit 233, and a storage unit 237, wherein the processing unit 233 is electrically connected to the transceiving interfaces 231, 235 and the storage unit 237. The electronic apparatus 25 comprises a storage unit 251, a processing unit 253, and a transceiving interface 255, wherein the processing unit 253 is electrically connected to the storage unit 251 and the transceiving interface 255.

Each of the transceiving interfaces 211, 231, 235, 255 may be any one of various transceiving interfaces that are well known to those of ordinary skill in the art. Each of the processing units 213, 233, 253 may be any one of various processors, central processing units, microprocessors, or other calculating apparatuses that are well known to those of ordinary skill in the art. Each of the storage units 215, 237, 251 may be any one of various built-in memories or other storage media that have the same function and can readily occur to those of ordinary skill in the art.

In this embodiment, the storage unit 251 of the electronic apparatus 25 stores a plurality of application keys $250a, \ldots, 250b$. Each of the application keys $250a, \ldots, 250b$ belongs to an application program installed in the electronic apparatus 25 and has a key identity (not shown). It shall be appreciated that the present invention has no limitation on the number of the application keys stored in the electronic apparatus 25. Management of the application keys $250a, \ldots, 250b$ of the electronic apparatus 25 is delegated by the major management apparatus 21 to the authorized management apparatus 23 through the key management mechanism of the present invention, which will be detailed later.

The storage unit 215 of the major management apparatus 21 stores two device keys $210a, 210b$. At the beginning, the transceiving interface 211 of the major management apparatus 21 transmits the device keys $210a, 210b$ to the authorized management apparatus 23 and the electronic apparatus 25, respectively. It is noted that the content of the device keys $210a, 210b$ are different. The device key $210a$ is received by the transceiving interface 231 of the authorized management apparatus 23 and stored into the storage unit 237. The device key 210b is received by the transceiving interface 255 of the electronic apparatus 25 via the authorized management apparatus 23 and stored into the storage unit 251. Subsequently, messages/signals transmitted between the major management apparatus 21 and the authorized management apparatus 23 are encrypted by the device key 210a before transmission, while messages/signals transmitted between the major management apparatus 21 and the electronic apparatus 25 are encrypted by the device key 210b before transmission.

It shall be appreciated that, in other implementations, the authorized management apparatus 23 and the electronic apparatus 25 may be respectively preset with a first original device key and a second original device key before being delivered from the manufacturing factory and the major management apparatus 21 may be preset with the first original device key and the second original device key as well. Under this circumstance, the major management apparatus 21 has to update these original device keys before delegating the management of the application keys 250a, ..., 250b of the electronic apparatus 25 to the authorized management apparatus 23. Specifically, the major management apparatus 21 transmits the device key 210a encrypted by the first original device key to the authorized management apparatus 23 so as to update the device key used between the major management apparatus 21 and the authorized management apparatus 23. Similarly, the major management apparatus 21 transmits the device key 210b encrypted by the second original device key to the electronic apparatus 25 so as to update the device key used between the major management apparatus 21 and the electronic apparatus 25.

After the allocation of the device keys 210a, 210b has been completed, the processing unit 213 of the major management apparatus 21 generates a first original delegation deployment message (not shown), which comprises an authorization key 200. The major management apparatus 21 can store the authorization key 200 into the storage unit 215. Then, the processing unit 213 encrypts the first original delegation deployment message into a delegation deployment message 302 by the device key 210a. Likewise, the processing unit 213 generates a second original delegation deployment message (not shown), which comprises the authorization key 200. Then, the processing unit 213 encrypts the second original delegation deployment message into a delegation deployment message 304 by the device key 210b. Thereafter, the transceiving interface 211 of the major management apparatus 21 transmits the delegation deployment messages 302, 304 to the authorized management apparatus 23 and the electronic apparatus 25 respectively.

The delegation deployment message 302 is received by the transceiving interface 231 of the authorized management apparatus 23 and then decrypted by the processing unit 233 into the first original delegation deployment message by the device key 210a. Thereby, the authorization key 200 is obtained. The authorization key 200 is stored into the storage unit 237. Similarly, the delegation deployment message 304 is received by the transceiving interface 255 of the electronic apparatus 25 and then decrypted by the processing unit 253 into the second original delegation deployment message by the device key 210b. Thereby, the authorization key 200 is obtained. The authorization key 200 is stored into the storage unit 251. At this point, the right of managing the application keys 250a, ..., 250b has been delegated by the major management apparatus 21 to the authorized management apparatus 23.

Next, how the authorized management apparatus 23 manages the application keys 250a, ..., 250b will be described. It is assumed that the authorized management apparatus 23 attempts to apply an operation (e.g., establishment, updating, suspension, restoration, revocation, or the like) to the application key 250a. The processing unit 233 generates an original key management message (not shown), which comprises an operation code (not shown) of the operation and the key identity of the application key 250a. Then, the processing unit 233 encrypts the original key management message into a key management message 306 by the authorization key 200. The transceiving interface 235 transmits the key management message 306 to the electronic apparatus 25.

The transceiving interface 255 of the electronic apparatus 25 receives the key management message 306 from the authorized management apparatus 23. The processing unit 253 decrypts the key management message 306 into the original key management message by the authorization key 200 to obtain the operation code and the key identity. Then, the processing unit 253 selects the application key 250a according to the key identity and applies the operation corresponding to the operation code to the application key 250a.

In other embodiments, if the authorized management apparatus 23 needs to apply an operation corresponding to a certain operation code to the application key 250a (e.g., set the application key 250a to a specific key value), then the original key management message further comprises the key value. Thus, the electronic apparatus 25 will apply the operation corresponding to the operation code to the application key 250a according to the key value.

If the authorized management apparatus 23 intends to manage the same application key again or manage other application keys in the electronic apparatus 25 later, the authorized management apparatus 23 only needs to generate the key management message 306 again. Depending on which application key is to be managed and which operation is to be executed, the key management message 306 generated subsequently may carry different key identities and operation codes and even different key values.

Moreover, this embodiment also provides a delegation revoking mechanism. If the major management apparatus 21 intends to suspend delegating the authorized management apparatus 23 to manage the application keys 250a, ..., 250b stored in the electronic apparatus 25, the transceiving interface 211 of the major management apparatus 21 will transmit another delegation deployment message 308 to the electronic apparatus 25. It shall be appreciated that an authorization key comprised in the delegation deployment message 308 is different from the authorization key comprised in the delegation deployment message 304. After the delegation deployment message 308 is received by the electronic apparatus 25, the authorized management apparatus 23 cannot apply any operation to the application keys 250a, ..., 250b stored in the electronic apparatus 25 any longer because the authorized management apparatus 23 and the electronic apparatus 25 have different authorization keys.

As can be known from the above descriptions, in the first embodiment, the major management apparatus 21 transmits the delegation deployment messages 302, 304 to the authorized management apparatus 23 and the electronic apparatus 25 respectively. Thereby, the authorized management apparatus 23 can execute the encrypting operation by the authorization key 200 comprised in the delegation deployment message 302 and the electronic apparatus 25 can execute the decrypting operation by the authorization key 200 comprised in the delegation deployment message 304. Then, the authorized management apparatus 23 can use the operation code and the key identity to manage each of the application keys 250a, ..., 250b of the electronic apparatus 25. Furthermore, by transmitting the new delegation deployment message 308, delegating operations of key management can also be revoked to achieve a flexible management effect.

Please refer to FIG. 2, FIG. 3, and FIG. 4 for a second embodiment of the present invention. FIG. 4 depicts a schematic view of an access right message 4 according to this embodiment. The operations executed by the major management apparatus 21, the authorized management apparatus 23, and the electronic apparatus 25 in the second embodiment are similar to those in the first embodiment, so only the differences between the second embodiment and the first embodiment will be detailed hereinbelow.

In this embodiment, the storage unit 215 of the major management apparatus 21 further stores the access right message 4. The second original delegation deployment message generated by the major management apparatus 21 further comprises the access right message 4 in addition to the authorization key 200. Therefore, after decrypting the delegation deployment message 304 into the second original delegation deployment message by the device key 210b, the electronic apparatus 25 obtains both the access right message 4 and the authorization key 200.

The access right message 4 records what kind of right has been delegated by the major management apparatus 21 to the authorized management apparatus 23; that is, which operation can be applied to which application key by the authorized management apparatus 23 can be learned from the access right message 4. As shown in FIG. 4, operation codes corresponding to each of key identities SKm-1, SKm-2, SKm-3, ..., SKm-j are recorded in the access right message 4 of this embodiment. In this embodiment, the key identity SKm-3 is an identity of the application key 250a, the key identity SKm-j is an identity of the application key 250b, and the key identities SKm-1, SKm-2 are identities of other application keys not shown. As an example, the key identity SKm-3 corresponds to the operation codes Op-2, Op-3; that is, the authorized management apparatus 23 is capable of applying operations corresponding to the operation codes Op-2, Op-3 to the application key corresponding to the key identity SKm-3.

In this embodiment, the processing unit 253 of the electronic apparatus 25 determines whether the authorized management apparatus 23 has a right of applying an operation corresponding to the operation code to an application key by looking up the access right message 4 according to the operation code and the key identity. It is assumed that the operations corresponding to the operation codes Op-1, Op-2, Op-3, Op-4 are generation, negotiation, updating, and suspension respectively. If the original key management message carries the key identity SKm-3 and the operation code Op-4, the processing unit 253 of the electronic apparatus 25 looks up the access right message 4 and then determines that the authorized management apparatus 23 does not have the right of suspending the application key 250a corresponding to the key identity SKm-3. Accordingly, the processing unit 253 will not execute the corresponding operation. As another example, if the original key management message carries the key identity SKm-3 and the operation code Op-3, the processing unit 253 of the electronic apparatus 25 looks up the access right message 4 and then determines that the authorized management apparatus 23 has the right of updating the application key 250a corresponding to the key identity SKm-3. Accordingly, the processing unit 253 will update the application key 250a.

According to the above descriptions, with the access right message 4, the major management apparatus 21 of the second embodiment can delegate key management to the authorized management apparatus 23 in a finer way. That is, delegation of key management can be fined to the level of different operations on different application keys.

Please refer to FIG. 2, FIG. 3, FIG. 5A, and FIG. 5B for a third embodiment of the present invention. FIG. 5A depicts a schematic view illustrating the relationships between a right verification message Rm-0, right levels and right tokens Rm-1, Rm-2, while FIG. 5B depicts a schematic view of an access right message 5. Likewise, in this embodiment, the key identity SKm-3 is an identity of the application key 250a, the key identity SKm-j is an identity of the application key 250b, and the key identities SKm-1, SKm-2 are identities of other application keys not shown. The operations corresponding to the operation codes Op-1, Op-2, Op-3, Op-4 are generation, negotiation, updating, and suspension respectively.

In this embodiment, the major management apparatus 21, the authorized management apparatus 23, and the electronic apparatus 25 can execute the operations described in the aforesaid embodiments. In addition, the major management apparatus 21 can further delegate the key management according to different right levels i. Furthermore, when the authorized management apparatus 23 manages the application keys of the electronic apparatus 25, a verification procedure can further be executed to achieve the effect of secure control.

The major management apparatus 21 determines which right level i to be assigned to the authorized management apparatus 23. Then, the processing unit 213 generates a right token according to the right verification message Rm-0, the right level i, and a hash function h. The aforesaid hash function h may be SHA-1, MD5, or some other hash function algorithm having a similar function. Specifically, the right level i is a positive integer, the processing unit 213 generates the right token by executing a predetermined times of the hash function h on the right verification message Rm-0, and the predetermined times is equal to the right level i. For example, if the right level i is 1, then the processing unit 213 execute a hash function h once on the right verification message Rm-0, and the right token Rm-1 with the right level of 1 is derived. As another example, if the right level i is 2, then the processing unit 213 executes the hash function h twice on the right verification message Rm-0, and the right token Rm-2 with the right level of 2 is generated. The operation of the hash function h is irreversible. Therefore, in this embodiment, the smaller the value of the right level i is, the larger the right scope delegated by the major management apparatus 21 to the authorized management apparatus 23 will be.

In this embodiment, the first original delegation deployment message generated by the major management apparatus 21 comprises the right level i and the corresponding right token as well as the authorization key 200. Therefore, after decrypting the delegation deployment message 302 into the first original delegation deployment message, the authorized management apparatus 23 obtains the right level i and the right token in addition to the authorization key 200. Similarly, the second original delegation deployment message generated by the major management apparatus 21 comprises the right verification message Rm-0 as well as the authorization key 200. Therefore, after decrypting the delegation deployment message 304 into the second original delegation deployment message, the electronic apparatus 25 obtains the right verification message Rm-0 in addition to the authorization key 200.

Thereafter, when the authorized management apparatus 23 intends to manage the application keys 250a, ..., 250b, the original key management message generated by the processing unit 233 comprises the right level i in addition to the key identity and the operation code. After decrypting the key management message 306 into the original key management message, the electronic apparatus 25 obtains the right level i in addition to the key identity and the operation code.

Furthermore, the processing unit 233 generates a verification message (not shown) related to the right level i and the right token. The transceiving interface 235 transmits the verification message to the electronic apparatus 25. After the verification message is received by the transceiving interface 255 of the electronic apparatus 25, the processing unit 253 performs a verification procedure on the verification message according to the right verification message Rm-0, the right level i, and the same hash function h. Only if the verification message passes the verification procedure, the electronic apparatus 25 allows the authorized management apparatus 23 to manage the application keys 250a, . . . , 250b according to the right level i.

It is assumed that the verification message passes the verification procedure and the original key management message carries the key identity SKm-3, the operation code Op-3, and the right level i having a value of 1. Then, the processing unit 253 of the electronic apparatus 25 will look up the access right message 5 shown in FIG. 5B and then determine that the authorized management apparatus 23 has the right of applying the operation corresponding to the operation code Op-3 to the application key 250a corresponding to the key identity SKm-3. Accordingly, the processing unit 253 will execute the operation corresponding to the operation code Op-3 to the application key 250a.

Subsequently, if the major management apparatus 21 intends to change the right level i delegated to the authorized management apparatus 23 (e.g., changing the value of the right level i from 2 to 1 or from 1 to 2), then the major management apparatus 21 needs to generate an additional original delegation deployment message, which comprises the updated right level i. The major management apparatus 21 encrypts the additional original delegation deployment message into an additional delegation deployment message by the device key 210a and transmits the additional delegation deployment message to the authorized management apparatus 23. After receiving and decrypting the new delegation deployment message, the authorized management apparatus 23 obtains the updated right level i.

Please refer to FIG. 2, FIG. 3, FIG. 5B, and FIG. 6 for a fourth embodiment of the present invention. FIG. 6 depicts a schematic view illustrating the relationships between a right verification message Rm-0, a right calculation auxiliary message Rm-A, right levels and right tokens Rm-1', Rm-2'. The fourth embodiment and the third embodiment are different only in terms of the generation manner of the right tokens. The following descriptions will be focused on the differences between the two embodiments.

In this embodiment, the processing unit 213 of the major management apparatus 21 generates the right token by the right verification message Rm-0, a right calculation auxiliary message Rm-A, the right level i, and the hash function h. The right calculation auxiliary message Rm-A comprises the access right message 5 and/or a device code related to the electronic apparatus 25 (e.g., an address of a hardware network interface card, a serial number, or the like of the electronic apparatus 25).

Before calculating the right token, the processing unit 213 integrates the right verification message Rm-0 and the right calculation auxiliary message Rm-A together, which can be achieved by concatenation for example. Thereafter, if the right level i is 1, then the processing unit 213 will execute the hash function h once on the right verification message Rm-0 and the right calculation auxiliary message Rm-A that are integrated together to obtain the right token Rm-1' with the right level of 1. If the right level i is 2, then the processing unit 213 will execute the hash function h twice on the right verification message Rm-0 and the right calculation auxiliary message Rm-A that are integrated together to obtain the right token Rm-2' with the right level of 2. For other values of the right level, the right token can be derived in the similar fashion.

Since the fourth embodiment generates the right tokens in a different way from the third embodiment, the authorized management apparatus 23 uses different verification messages related to the right levels i and the right tokens. In this embodiment, after the verification message is received by the transceiving interface 255 of the electronic apparatus 25, the processing unit 253 performs a verification procedure on the verification message according to the right verification message Rm-0, the right calculation auxiliary message Rm-A, the right level i, and the same hash function h.

In addition to the aforesaid operations, other operations that can be performed by the fourth embodiment are the same as those of the third embodiment, so the details are not repeated herein. Since the right token is generated by the right verification message Rm-0 and the right calculation auxiliary message Rm-A in the fourth embodiment, delegation of key management can be achieved more precisely. That is, the right scope of the right level i is specialized to the right scope defined by the access right message 5 and/or is only limited to the electronic apparatus with a specific device code (by incorporating the right calculation auxiliary message Rm-A to calculate the right token).

Figure 7A:
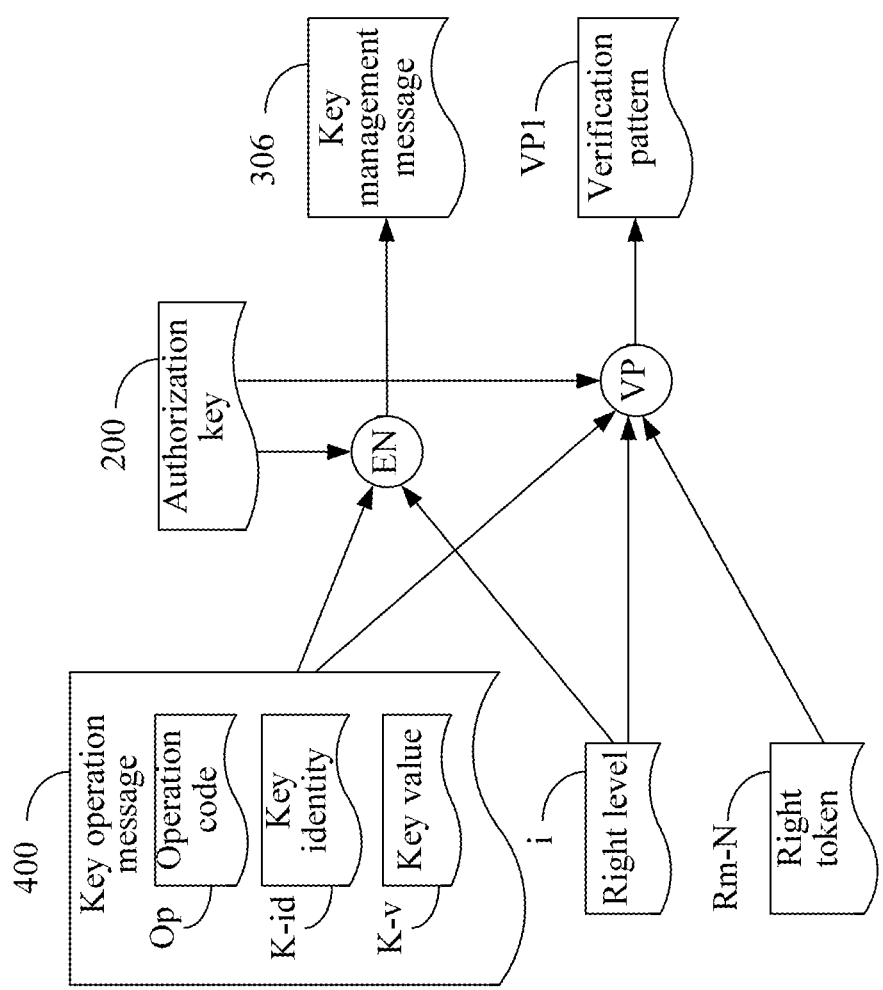
FIG. 7A depicts the generation of a key management message 306 and a verification pattern VP1 according to a fifth embodiment.
Figure 7B:
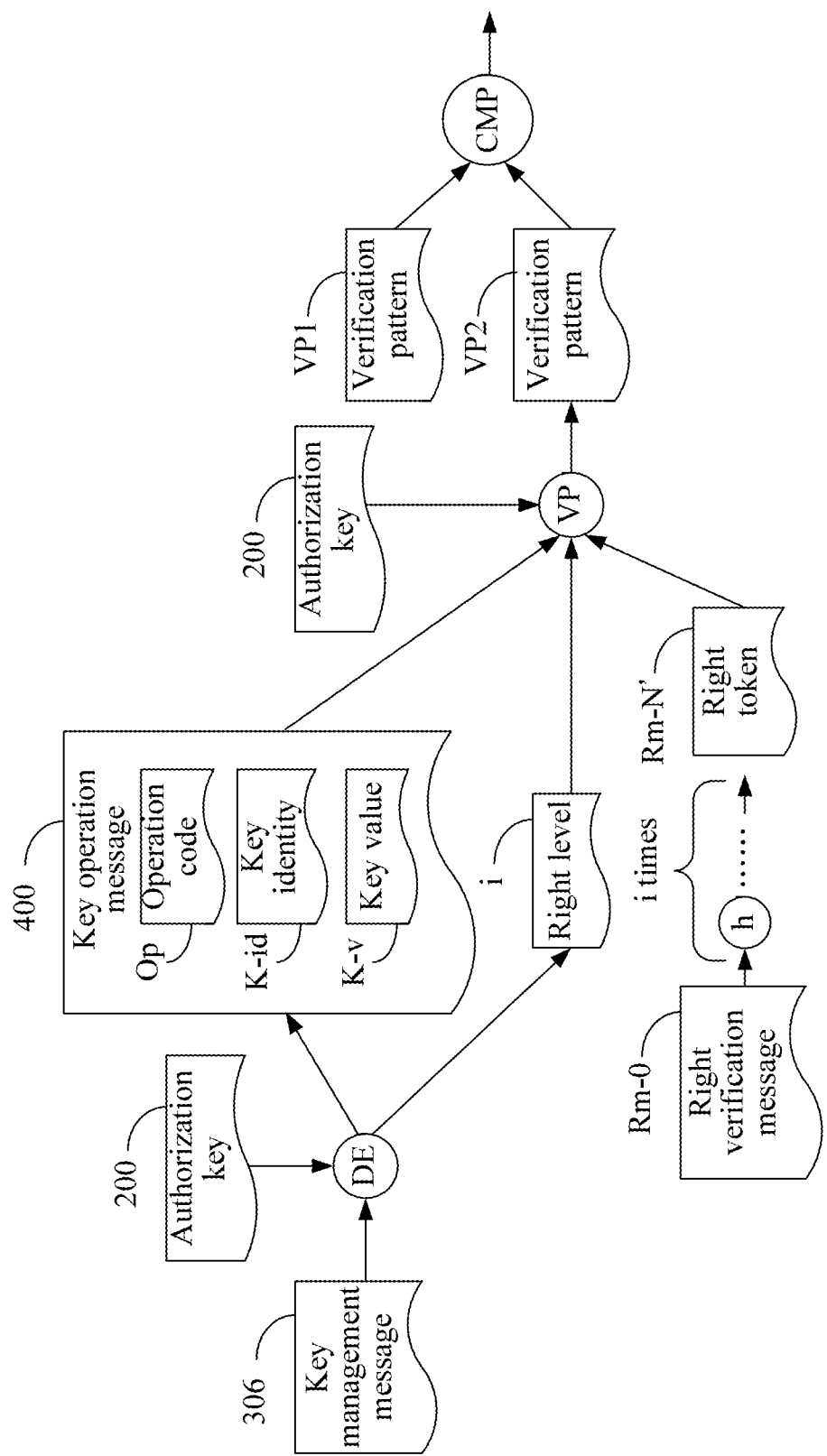
FIG. 7B depicts a schematic view of a verification procedure according to the fifth embodiment.

Please refer to FIG. 2, FIG. 3, FIG. 5B, FIG. 7A, and FIG. 7B for a fifth embodiment of the present invention. FIG. 7A depicts the generation of a key management message 306 and a verification pattern VP1, while FIG. 7B depicts a schematic view of a verification procedure.

When the authorized management apparatus 23 intends to manage the application keys 250a, . . . , 250b, the processing unit 233 generates two different messages by a key operation message 400 as well as a right token Rm-N and a right level i assigned by the major management apparatus 21. The key operation message 400 comprises an operation code Op, a key identity K-id, and a key value K-v. In other embodiments, if the key management to be performed by the authorized management apparatus 23 does not need the key value, the authorized management apparatus 23 will not use the key value K-v when generating the two messages.

Specifically, the processing unit 233 obtains the verification pattern VP1 by executing a verification pattern operation VP according to the right token Rm-N, the right level i, the key operation message 400, and the authorization key 200. The verification pattern VP1 is the first message. The aforesaid verification pattern operation VP may be a message authentication code operation or some other operation having a similar function. Furthermore, the processing unit 233 views the right level i and the key operation message 400 as an original key management message. Then, the processing unit 233 generates the key management message 306 by executings an encrypting operation EN on the original key management message. The key management message 306 is the second message.

The transceiving interface 235 of the authorized management apparatus 23 transmits the two messages (i.e., the verification pattern VP1 and the key management message 306) to the electronic apparatus 25 and the transceiving interface 255 of the electronic apparatus 25 receives the two messages.

The electronic apparatus 25 derives the original key management message by executing a decrypting operation DE on the key management message 306 by the authorization key 200. As the original key management message is derived, the right level i and the key operation message 400 are derived as well.

If the right token Rm-N that is assigned to the authorized management apparatus 23 by the major management apparatus 21 is generated based on the right verification message Rm-0 (as shown in FIG. 5A), then the processing unit 253 of the electronic apparatus 25 will generate a right token Rm-N' by the right verification message Rm-0, the right level i, and the same hash function. Specifically, the right level i is a positive integer, the processing unit 253 generates the right token Rm-N' by executing a predetermined times of the hash function h on the right verification message Rm-0, and the predetermined times is equal to the right level i. Thereafter, the processing unit 253 generates a verification pattern VP2 by executing the same verification pattern operation VP by the right token Rm-N', the right level i, the key operation message 400, and the authorization key 200.

If the right token Rm-N that is assigned to the authorized management apparatus 23 by the major management apparatus 21 is generated based on the right verification message Rm-0 and the right calculation auxiliary message Rm-A (as shown in FIG. 6), then the processing unit 253 of the electronic apparatus 25 will generate a right token Rm-N' by the right verification message Rm-0, the right calculation auxiliary message Rm-A, the right level i, and the same hash function h. Specifically, the right level i is a positive integer, the processing unit 253 generates the right token Rm-N' by executing a predetermined times of the hash function h on the right verification message Rm-0 and the right calculation auxiliary message Rm-A, and the predetermined times is equal to the right level i. Thereafter, the processing unit 253 obtains a verification pattern VP2 by executing the same verification pattern operation VP by the right token Rm-N', the right level i, the key operation message 400, and the authorization key 200.

Subsequently, the processing unit 253 executes a comparison operation CMP on the verification pattern VP1 and the verification pattern VP2, i.e., determines whether the verification pattern VP2 is the same as the received verification pattern VP1. If the verification pattern VP2 is the same as the verification pattern VP1 (i.e. meaning that the authorized management apparatus 23 passes the verification procedure), then the processing unit 253 will determine how to operate the application keys (e.g., by looking up the access right message) according to the key operation message 400. If the verification pattern VP2 is different from the verification pattern VP1 (i.e. meaning that the authorized management apparatus 23 does not pass the verification procedure), then the electronic apparatus 25 will not execute any operation on the application keys.

It is noted that the authorization key used during the encrypting operation EN/the decrypting operation DE may be different from the authorization key used during the verification pattern operation in other embodiments. Under these circumstances, the delegation deployment messages 302, 304 have to comprise two authorization keys.

In addition to the aforesaid operations (i.e., the generation of the key management message 306 and the verification pattern VP1 and the execution of the verification procedure), the fifth embodiment can also execute the other operations that can be executed by the first to the fourth embodiments, which are not repeated herein.

Figure 8A:
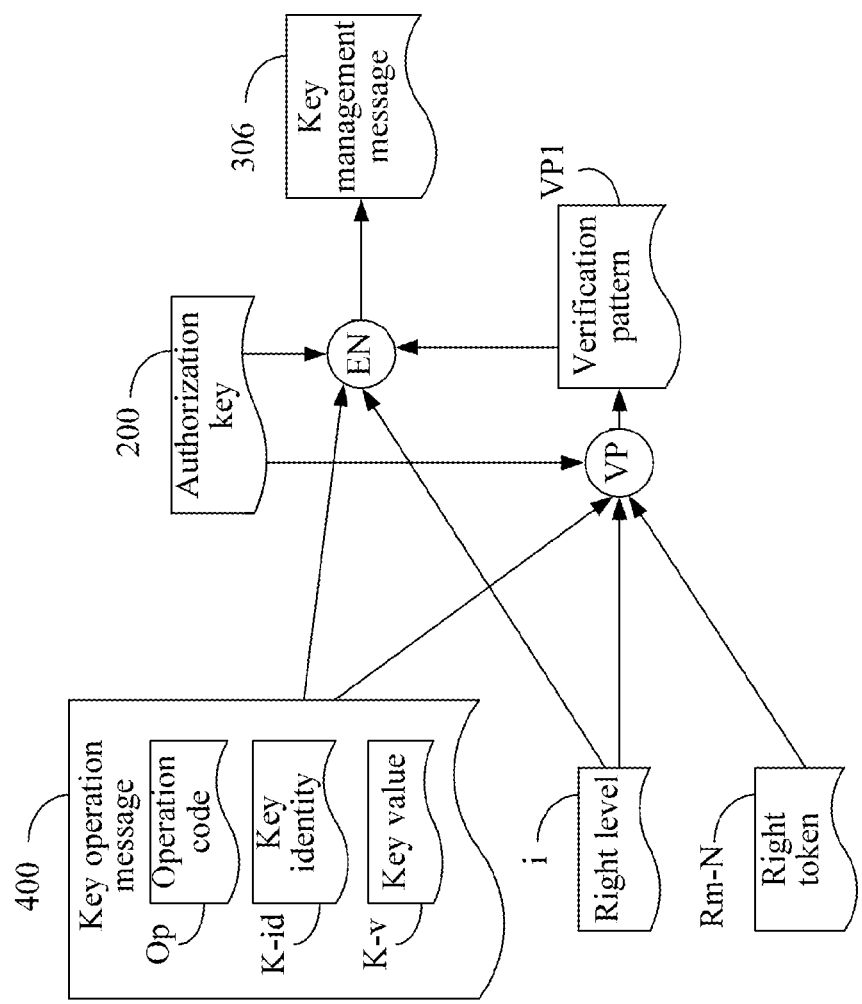
FIG. 8A depicts the generation of a key management message 306 and a verification pattern VP1 according to a sixth embodiment.
Figure 8B:
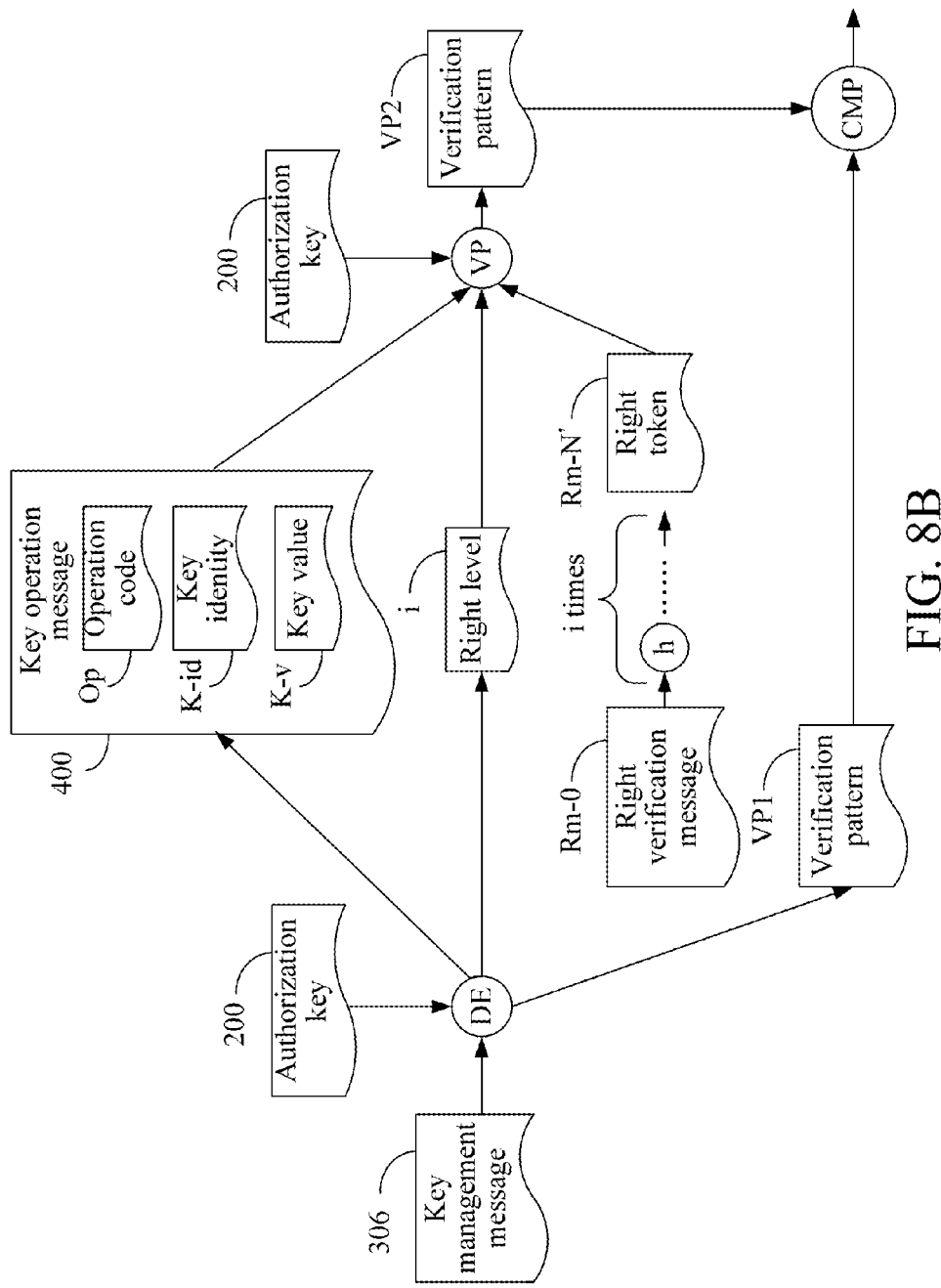
FIG. 8B depicts a schematic view of a verification procedure according to the sixth embodiment.

Please refer to FIG. 2, FIG. 3, FIG. 5B, FIG. 8A and FIG. 8B for a sixth embodiment of the present invention. FIG. 8A depicts the generation of a key management message 306 and a verification pattern VP1, while FIG. 8B depicts a schematic view of a verification procedure. The sixth embodiment differs from the fifth embodiment in the way of generating the key management message 306 and the verification pattern VP1 and the corresponding verification procedure.

When the authorized management apparatus 23 intends to manage the application keys $250a, \ldots, 250b$, the processing unit 233 obtains the verification pattern VP1 by executing a verification pattern operation VP by the authorization key 200, a key operation message 400, a right token Rm-N, and a right level i assigned by the major management apparatus 21. The key operation message 400 comprises an operation code Op, a key identity K-id, and a key value K-v. It shall be appreciated that the key value K-v may be omitted in the key operation message in other implementations.

In this embodiment, the original key management message comprises the right level i, the key operation message 400, and the verification pattern VP1. The processing unit 233 executes an encrypting operation EN on the original key management message by the authorization key 200 to generate the key management message 306. Afterwards, the transceiving interface 235 transmits the key management message 306 to the electronic apparatus 25.

After the key management message 306 is received by the transceiving interface 255 of the electronic apparatus 25, the processing unit 253 executes a decrypting operation DE on the key management message 306 by the authorization key 200 to generate the original key management message. As the original key management message is generated, the right level i, the key operation message 400, and the verification pattern VP1 are obtained.

If the right token Rm-N that is previously assigned to the authorized management apparatus 23 by the major management apparatus 21 is generated based on the right verification message Rm-0 (as shown in FIG. 5A), then the processing unit 253 will generate a right token Rm-N' by the right verification message Rm-0, the right level i, and the same hash function h. If the right token Rm-N that is previously assigned to the authorized management apparatus 23 by the major management apparatus 21 is generated based on the right verification message Rm-0 and the right calculation auxiliary message Rm-A (as shown in FIG. 6), then the processing unit 253 of the electronic apparatus 25 will generate a right token Rm-N' by the right verification message Rm-0, the right calculation auxiliary message Rm-A, the right level i, and the same hash function h. The processing unit 253 obtains a verification pattern VP2 by executing the same verification pattern operation VP by the right token Rm-N', the right level i, the key operation message 400, and the authorization key 200.

Likewise, the processing unit 253 executes a comparison operation CMP on the verification pattern VP1 and the verification pattern VP2, i.e., determines whether the verification pattern VP2 is the same as the verification pattern VP1. If the verification pattern VP2 is the same as the verification pattern VP1 (i.e. meaning that the authorized management apparatus 23 passes the verification procedure), then the processing unit 253 will determine how to operate the application keys according to the key operation message 400. If the verification pattern VP2 is different from the verification pattern VP1 (i.e. meaning that the authorized management apparatus 23 does not pass the verification procedure), then the electronic apparatus 25 will not execute any operation on the application keys.

It shall be appreciated that the authorization key used during the encrypting operation EN/the decrypting operation DE may be different from the authorization key used during the verification pattern operation in other implementations. In these implementations, each of the delegation deployment messages 302, 304 has to comprise two authorization keys.

In addition to the aforesaid operations (i.e., the generation of the key management message 306 and the verification pattern VP1 and the execution of the verification procedure), the sixth embodiment can also execute the other operations that can be executed by the first to the fourth embodiments, which are not repeated herein.

Figure 9A:
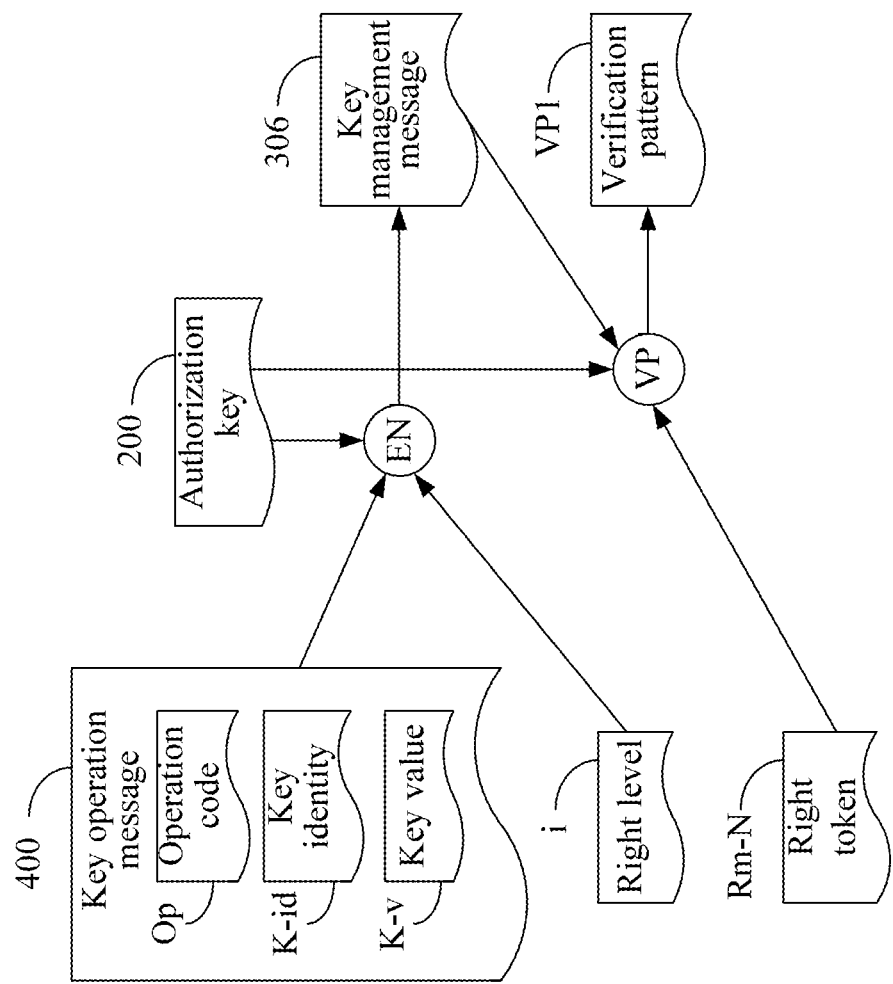
FIG. 9A depicts the generation of a key management message 306 and a verification pattern VP1 according to a seventh embodiment.
Figure 9B:
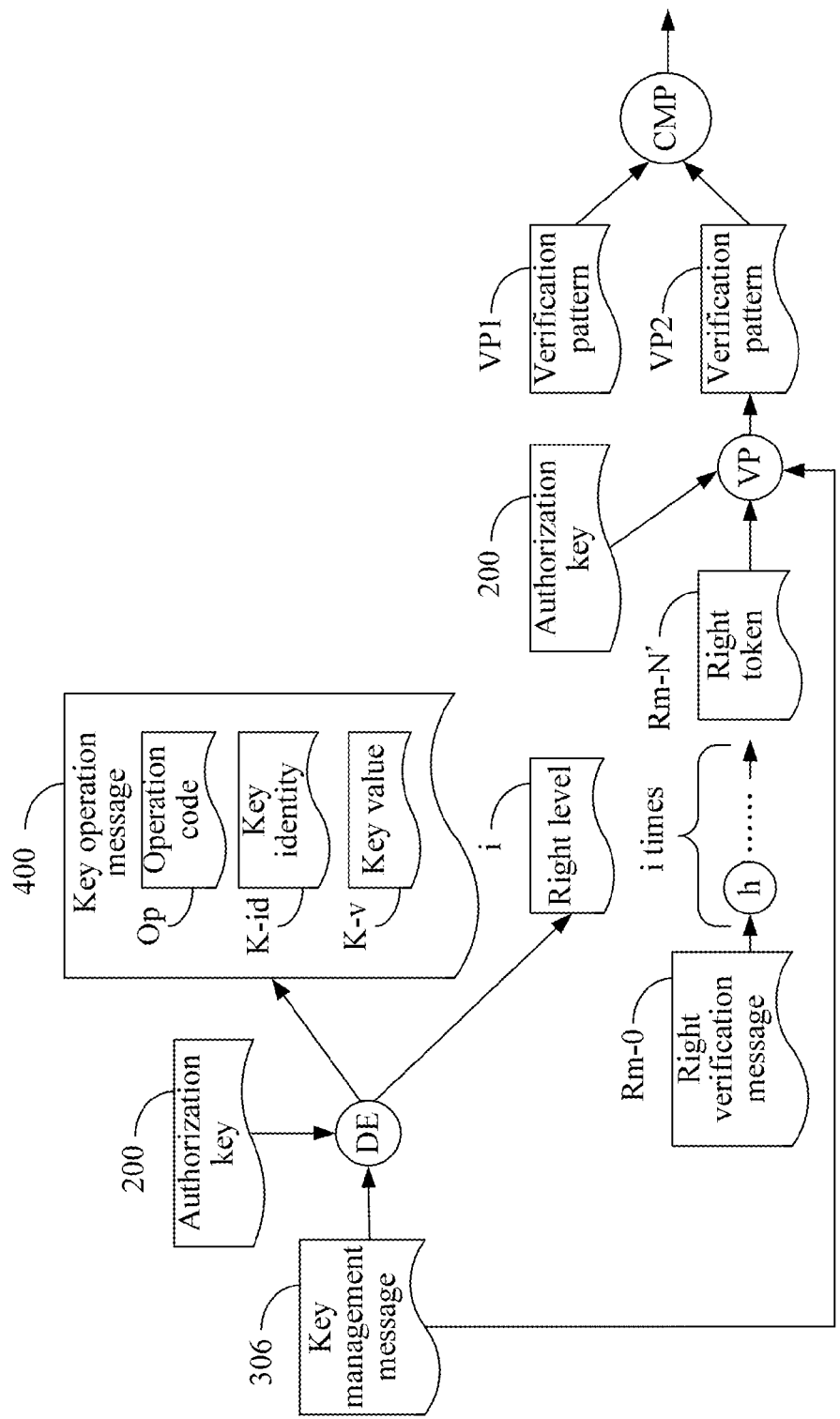
FIG. 9B depicts a schematic view of a verification procedure according to the seventh embodiment.

Please refer to FIG. 2, FIG. 3, FIG. 5B, FIG. 9A and FIG. 9B for a seventh embodiment of the present invention. FIG. 9A depicts the generation of a key management message 306 and a verification pattern VP1, while FIG. 9B depicts a schematic view of a verification procedure. The seventh embodiment differs from the fifth and the sixth embodiments in the way of generating the key management message 306 and the verification pattern VP1 and in the corresponding verification procedure.

When the authorized management apparatus 23 intends to manage the application keys 250a, . . . , 250b, the processing unit 233 generates two different messages by using a key operation message 400 as well as a right token Rm-N and a right level i assigned by the major management apparatus 21. It shall be appreciated that the key operation message 400 comprises an operation code Op, a key identity K-id, and a key value K-v; however, the key value K-v may be omitted in other implementations.

The processing unit 233 views the right level i and the key operation message 400 as an original key management message and executes an encrypting operation EN on the original key management message by the authorization key 200 to generate the key management message 306. The key management message 306 is the first message. Furthermore, the processing unit 233 obtains the verification pattern VP1 by executing a verification pattern operation VP by the right token Rm-N, the key management message 306, and the authorization key 200. The verification pattern VP1 is the second message. The transceiving interface 235 of the authorized management apparatus 23 transmits the two messages (i.e., the key management message 306 and the verification pattern VP1) to the electronic apparatus 25, while the transceiving interface 255 of the electronic apparatus 25 receives the two messages.

The electronic apparatus 25 executes a decrypting operation DE on the key management message 306 by the authorization key 200 to generate the original key management message. As the original key management message is generated, the right level i and the key operation message 400 are obtained. If the right token Rm-N that is previously assigned to the authorized management apparatus 23 by the major management apparatus 21 is generated based on the right verification message Rm-0 (as shown in FIG. 5A), then the processing unit 253 will generate a right token Rm-N' by the right verification message Rm-0, the right level i, and the same hash function h. If the right token Rm-N that is previously assigned to the authorized management apparatus 23 by the major management apparatus 21 is generated based on the right verification message Rm-0 and the right calculation auxiliary message Rm-A, then the processing unit 253 of the electronic apparatus 25 will generate a right token Rm-N' by the right verification message Rm-0, the right calculation auxiliary message Rm-A, the right level i, and the same hash function h. Furthermore, the processing unit 253 obtains a verification pattern VP2 by executing the same verification pattern operation VP by the authorization key 200, the right token Rm-N', and the key management message 306.

Likewise, the processing unit 253 executes a comparison operation CMP on the verification pattern VP1 and the verification pattern VP2, i.e., determines whether the verification pattern VP2 is the same as the verification pattern VP1. If the verification pattern VP2 is the same as the verification pattern VP1 (i.e. meaning that the authorized management apparatus 23 passes the verification procedure), then the processing unit 253 will determine how to operate the application keys according to the key operation message 400. If the verification pattern VP2 is different from the verification pattern VP1 (i.e. meaning that the authorized management apparatus 23 does not pass the verification procedure), then the electronic apparatus 25 will not execute any operation on the application keys.

It shall be appreciated that the authorization key used during the encrypting operation EN/the decrypting operation DE may be different from the authorization key used during the verification pattern operation in other implementations. In these implementations, each of the delegation deployment messages 302, 304 has to comprise two authorization keys.

In addition to the aforesaid operations (i.e., the generation of the key management message 306 and the verification pattern VP1 and the execution of the verification procedure), the seventh embodiment can also execute the other operations that can be executed by the first to the fourth embodiments, and no further description will be made thereon herein.

Figure 10A:
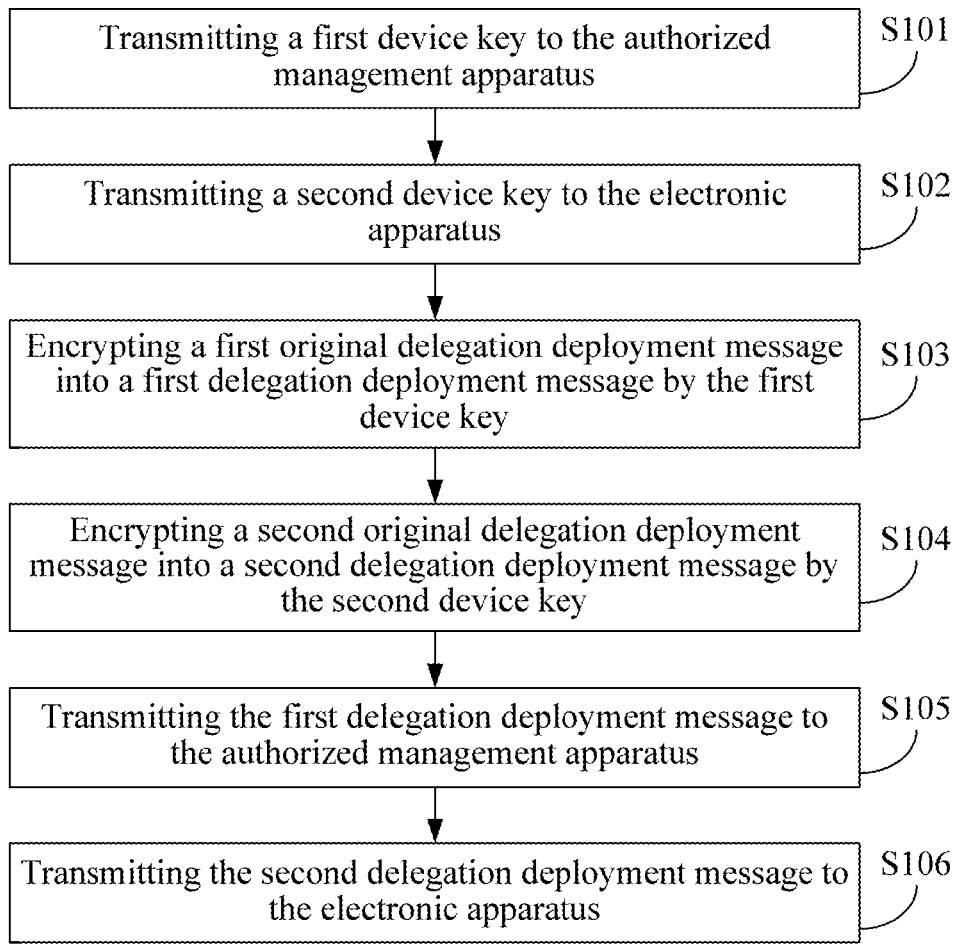
FIGS. 10A, 10B, and 10C depict the flowcharts of a key management method according to an eighth embodiment.
Figure 10B:
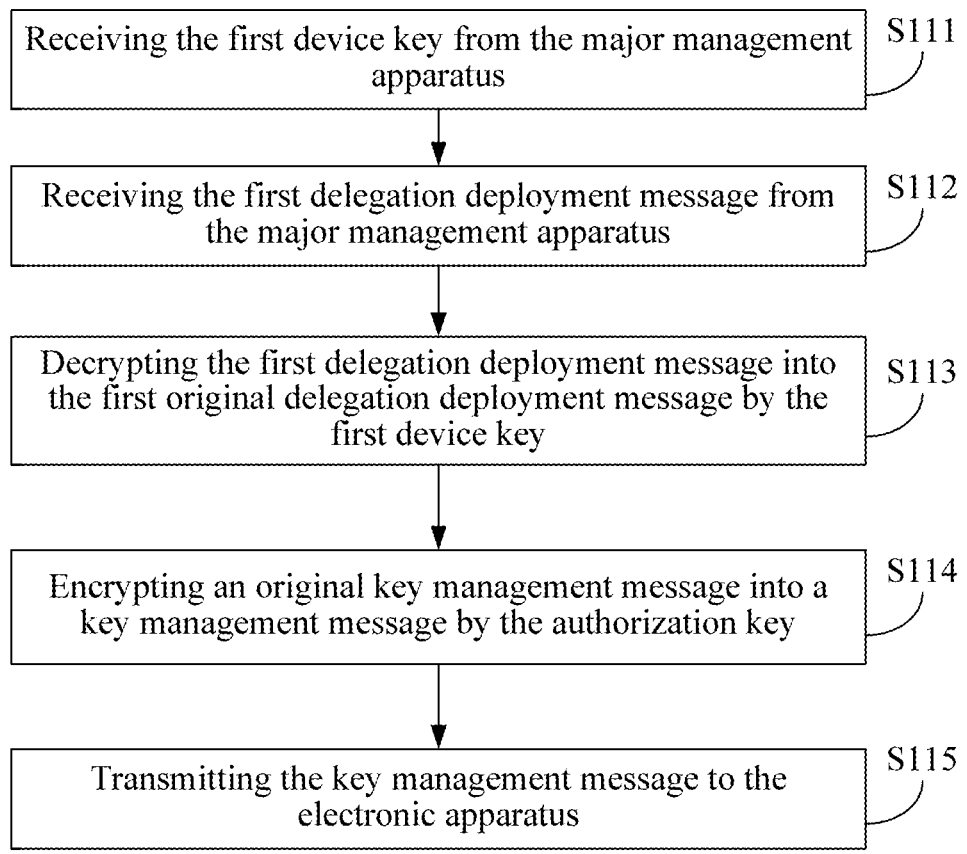
Figure 10C:
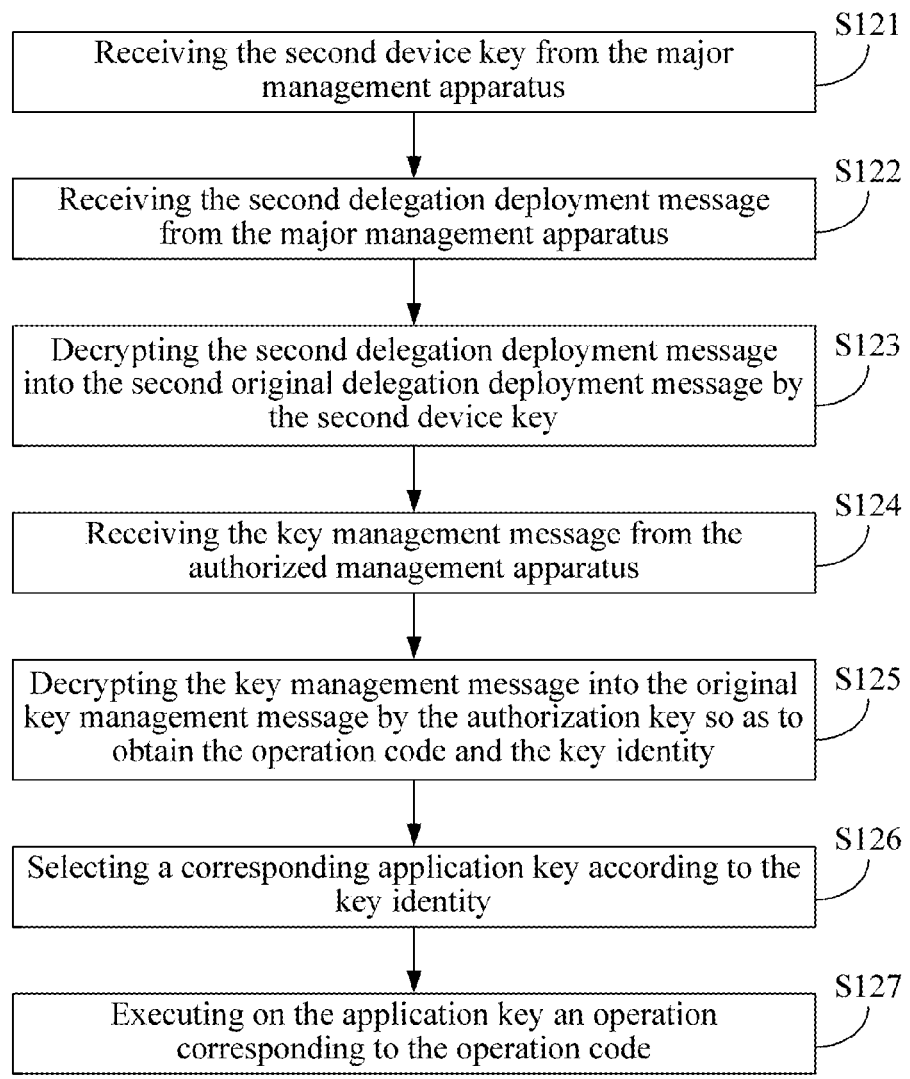

An eighth embodiment of the present invention is a key management method, which can be used in a network system (e.g., the aforesaid network system 2). The network system comprises a major management apparatus, an authorized management apparatus, and an electronic apparatus. FIG. 10A, FIG. 10B and FIG. 10C depict flowcharts of the key management methods executed by the major management apparatus, the authorized management apparatus, and the electronic apparatus respectively.

Firstly, the key management method executed by the major management apparatus will be described. Step S101 and step S102 are executed to enable the major management apparatus to transmit a first device key to the authorized management apparatus and transmit a second device key to the electronic apparatus respectively. It shall be appreciated that the execution orders of the step S101 and the step S102 may be exchanged.

Next, step S103 is executed to enable the major management apparatus to encrypt a first original delegation deployment message into a first delegation deployment message by the first device key, wherein the first original delegation deployment message comprises an authorization key. Step S104 is executed to enable the major management apparatus to encrypt a second original delegation deployment message into a second delegation deployment message by the second device key, wherein the second original delegation deployment message comprises the same authorization key. It shall be appreciated that the execution orders of the step S103 and the step S104 may be exchanged.

Subsequently, step S105 and step S106 are executed to enable the major management apparatus to transmit the first delegation deployment message to the authorized management apparatus and transmit the second delegation deployment message to the electronic apparatus respectively. It shall be appreciated that the execution orders of the step S105 and the step S106 may be exchanged.

Next, the key management method executed by the authorized management apparatus will be described. Step S111 is executed to enable the authorized management apparatus to receive the first device key from the major management apparatus. Step S112 is executed to enable the authorized management apparatus to receive the first delegation deployment message from the major management apparatus. Subsequently, step S113 is executed to decrypt the first delegation deployment message into the first original delegation deployment message by the first device key so as to obtain the authorization key. Step S114 is executed to enable the authorized management apparatus to encrypt an original key management message into a key management message by the authorization key, wherein the original key management message comprises an operation code and a key identity. Then, step S115 is executed to enable the authorized management apparatus to transmit the key management message to the electronic apparatus.

Next, the key management method executed by the electronic apparatus will be described. Step S121 is executed to enable the electronic apparatus to receive the second device key from the major management apparatus via the authorized management apparatus. Then, step S122 is executed to enable the electronic apparatus to receive the second delegation deployment message from the major management apparatus via the authorized management apparatus. Step S123 is executed to enable the electronic apparatus to decrypt the second delegation deployment message into the second original delegation deployment message by the second device key so as to obtain the authorization key. Then, step S124 is executed to enable the electronic apparatus to receive the key management message from the authorized management apparatus. Step S125 is executed to enable the electronic apparatus to decrypt the key management message into the original key management message by the authorization key so as to obtain the operation code and the key identity. Then, step S126 is executed to enable the electronic apparatus to select a corresponding application key according to the key identity. Subsequently, step S127 is executed to enable the electronic apparatus to apply an operation corresponding to the operation code to the application key.

In other implementations, some operations need to set the application key as a specific value, so the original key management message further comprises a key value. Thereby, in the step S127, the electronic apparatus applies the operation corresponding to the operation code to the application key according to the key value.

In other embodiments, the second original delegation deployment message further comprises an access right message in addition to the authorization key. Under these circumstances, the electronic apparatus further obtains the access right message in addition to the authorization key after the execution of the step S123. In addition, after the execution of the step S125, the electronic apparatus will look up the access right message according to the operation code and the key identity to determine whether the authorized management apparatus has a right of applying the operation corresponding to the operation code to the application key. If the authorized management apparatus has the right, then the steps S126 and S127 will be executed.

In addition to the aforesaid steps, the key management method of the eighth embodiment can also execute all the operations and has all the functions set forth in the first and the second embodiments. How the eighth embodiment executes these operations and functions can be readily appreciated by those of ordinary skill in the art based on the explanation of the first to the second embodiments, and thus will not be further described herein.

A ninth embodiment of the present invention is a key management method, which is also suitable for use in a network system. The network system comprises a major management apparatus, an authorized management apparatus and an electronic apparatus. The steps executed in the ninth embodiment are similar to those executed in the eighth embodiment, so only differences between the two embodiments will be detailed hereinbelow.

Figure 11A:
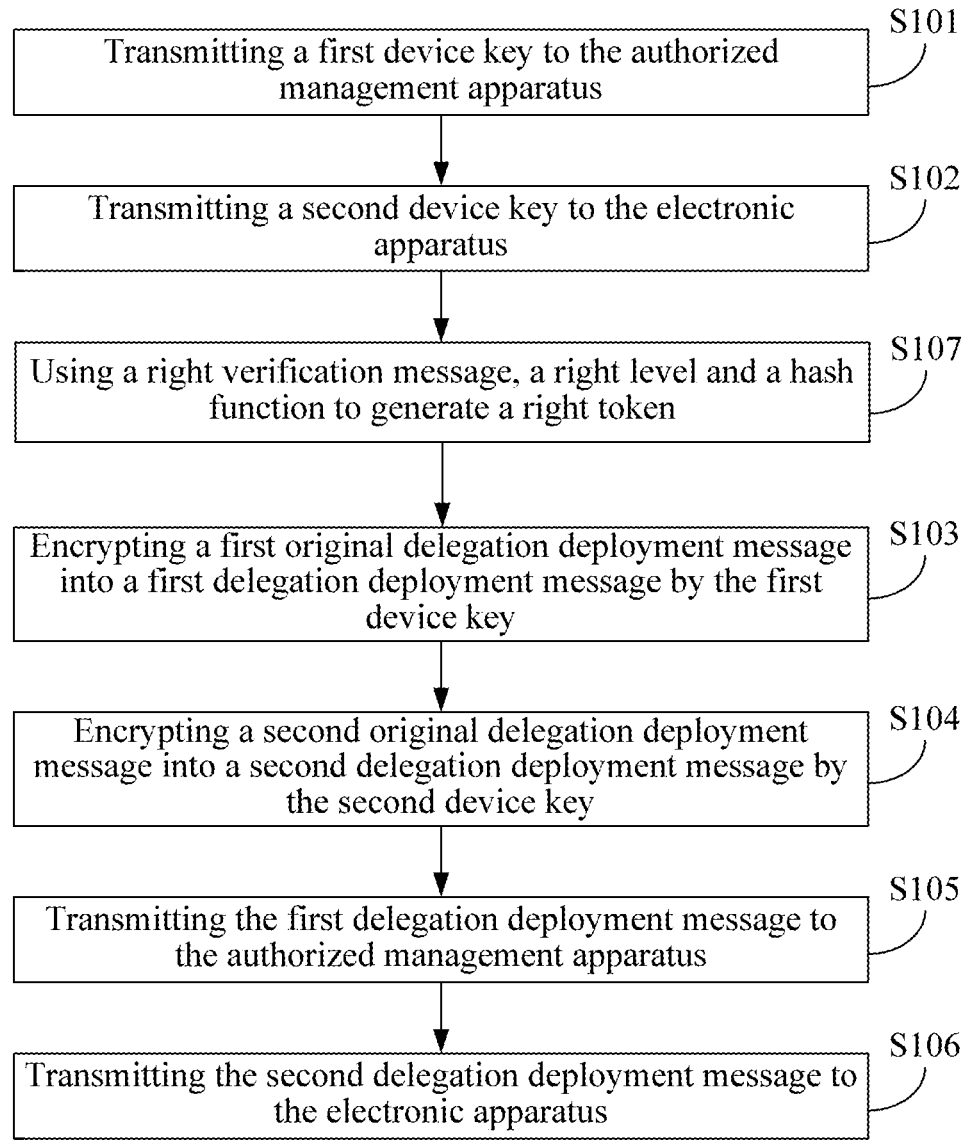
FIGS. 11A, 11B, and 11C depict flowcharts of a key management method according to a ninth embodiment.

Referring to FIG. 11A, a flowchart of the key management method executed by the major management apparatus according to this embodiment is illustrated. In this embodiment, the major management apparatus executes the steps S101 and S102 firstly. Then, step S107 is executed to generate a right token by a right verification message, a right level, and a hash function. Specifically, the right level is a positive integer, the step S107 generates the right token by executing a predetermined times of the hash function on the right verification message, and the predetermined times is equal to the right level.

In this embodiment, the first original delegation deployment message further comprises the right level and the right token in addition to the authorization key, while the second original delegation deployment message further comprises the right verification message in addition to the authorization key. Then, the major management apparatus executes the steps S103 to S106.

Figure 11B:
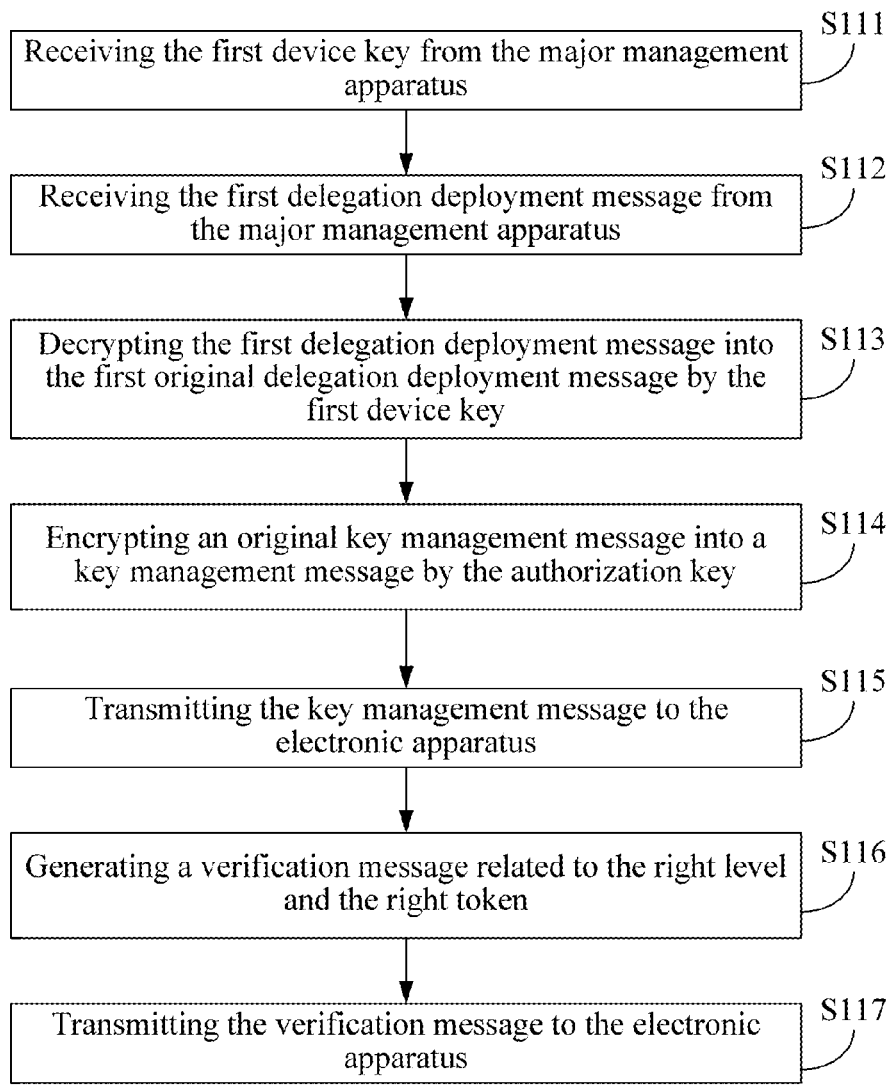

Referring to FIG. 11B, a flowchart of the key management method executed by the authorized management apparatus according to this embodiment is illustrated. In this embodiment, the authorized management apparatus firstly executes the steps S111 to S115, which have been detailed in the previous embodiment. It is noted that, in the step S113, the authorized management apparatus further obtains the right level and the right token in addition to the authorization key after decrypting the first delegation deployment message into the first original delegation deployment message. Furthermore, the original key management message used in the step S114 further comprises the right level in addition to the operation code and the key identity.

Subsequently, step S116 is executed to enable the authorized management apparatus to generate a verification message related to the right level and the right token. Then, step S117 is executed to enable the authorized management apparatus to transmit the verification message to the electronic apparatus. It shall be appreciated that the step S115 and the step S117 may be combined together in other implementations; that is, the key management message and the verification message are transmitted to the electronic apparatus together after the verification message is generated.

Figure 11C:
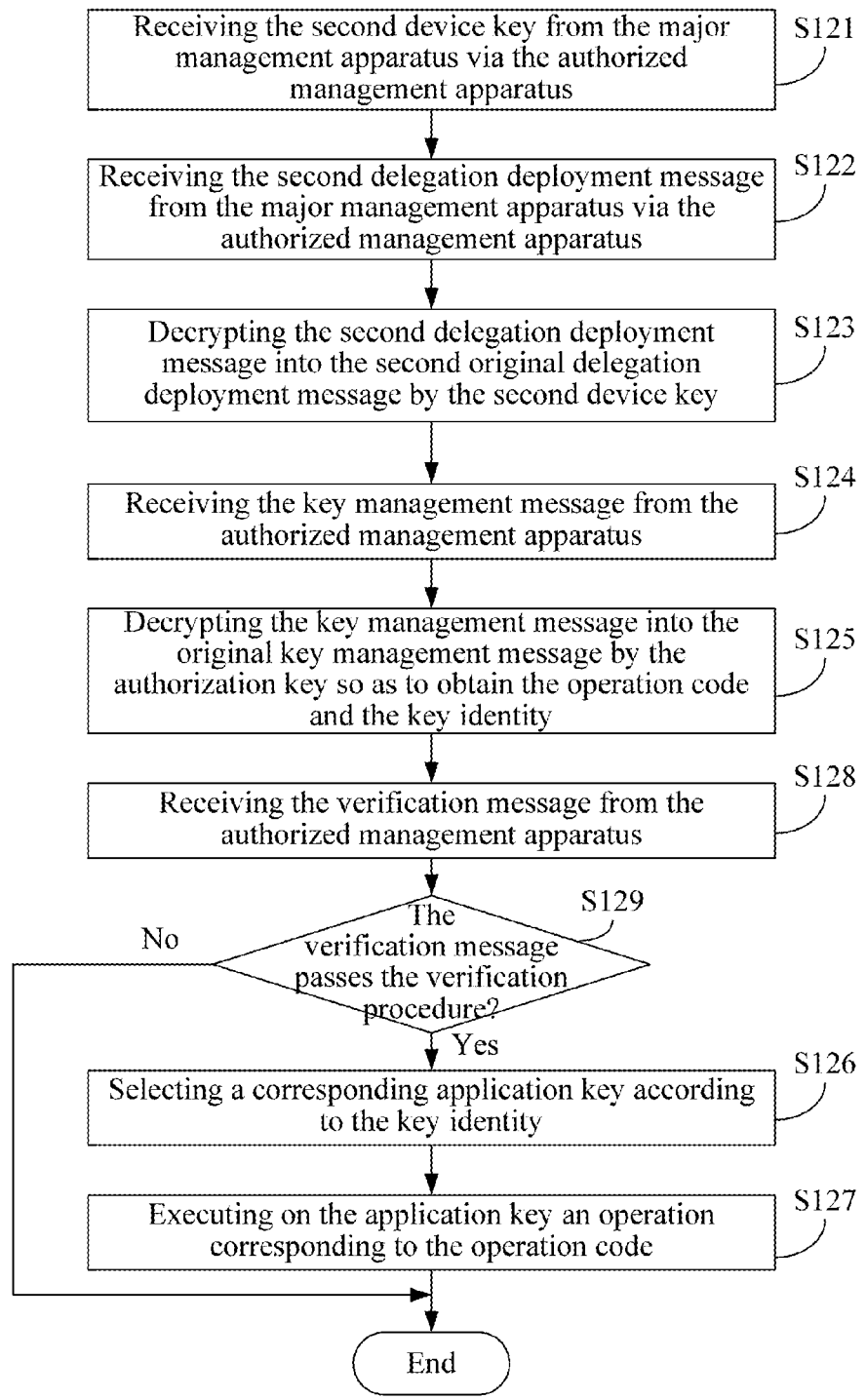
Figure 12:
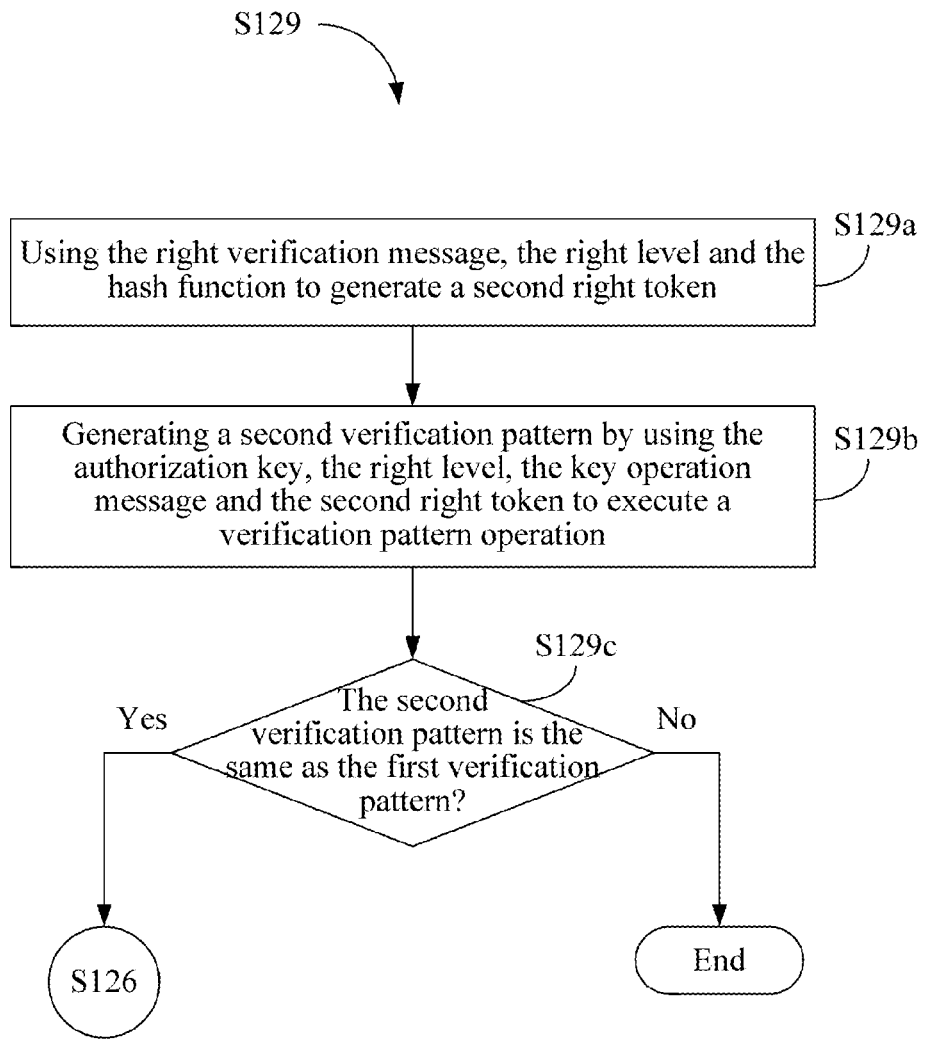
FIG. 12 depicts a partial flowchart of a key management method according to a tenth embodiment.
Figure 13:
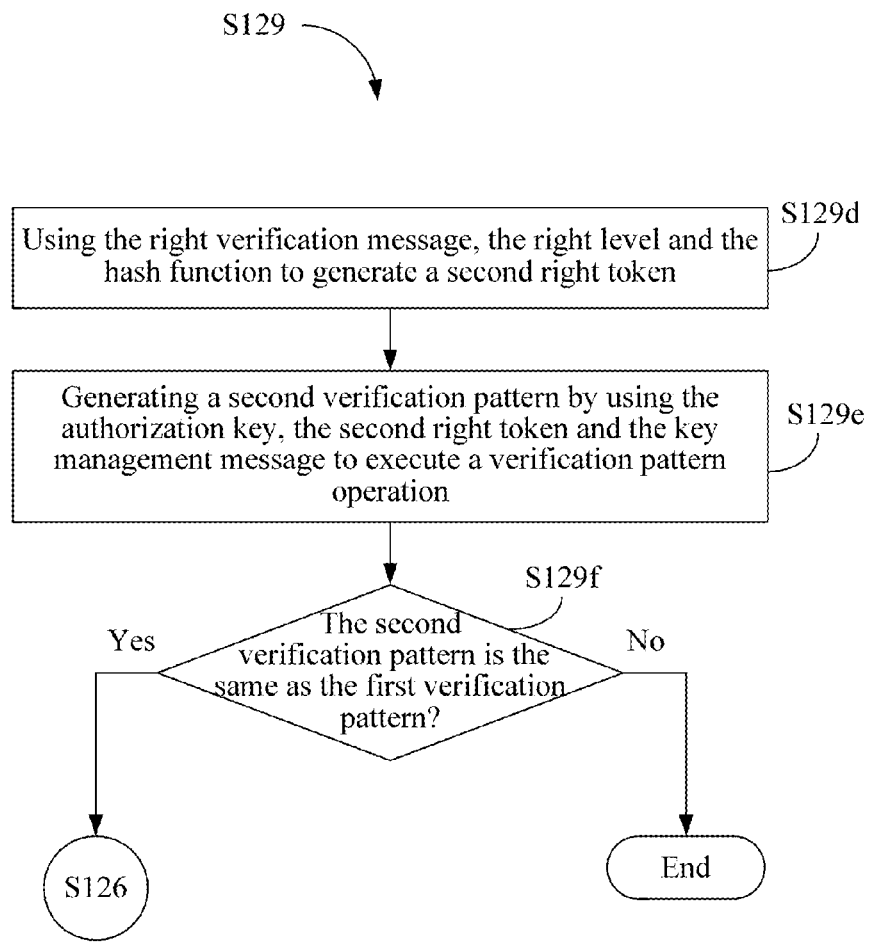
FIG. 13 depicts a partial flowchart of a key management method according to an eleventh embodiment.

Referring to FIG. 11C, a flowchart of the key management method executed by the electronic apparatus according to this embodiment is illustrated. In this embodiment, the electronic apparatus firstly executes the steps S121 to S125, which have been detailed in the previous embodiment. It is noted that, in the step S123, the electronic apparatus further obtains the right verification message in addition to the authorization key after decrypting the second delegation deployment message into the second original delegation deployment message. Furthermore, in the step S125, the electronic apparatus further obtains the right level in addition to the operation code and the key identity after decrypting the key management message into the original key management message by the authorization key.

Subsequently, step S128 is executed to enable the electronic apparatus to receive the verification message from the authorized management apparatus. If the authorized management apparatus transmit the key management message and the verification message to the electronic apparatus together by combining the step S115 and the step S117, then the steps S124 and S128 executed by the electronic apparatus can be combined together as well.

Then, step S129 is executed to enable the electronic apparatus to verify the verification message according to the right verification message, the right level, and the hash function (i.e. to determine whether the verification message passes the verification procedure). If the answer of the step S129 is "yes", then the steps S126 and S127 will be executed subsequently. If the answer of the step S129 is "no", then the electronic apparatus will end the key management method executed at this stage.

It shall be appreciated that, in other implementations, the step S107 executed by the major management apparatus may generate the right token by the right verification message, a right calculation auxiliary message, the right level, and the hash function. The right calculation auxiliary message comprises one the access right message, a device code associated with the electronic apparatus, and the combination thereof. Specifically, the right level is a positive integer, the step S107 generates the right token by executing a predetermined times of the hash function on the right verification message and the right calculation auxiliary message, and the predetermined times is equal to the right level. In this case, the step S129 executed by the electronic apparatus verifies the verification message according to the right verification message, the right calculation auxiliary message, the right level, and the hash function and determines whether the verification message passes the verification procedure.

Furthermore, in other implementations, the key management method may further comprise the following steps so that the major management apparatus directly manages some application keys in the electronic apparatus. Specifically, the major management apparatus may further execute a step (not shown) of encrypting another original key management message into another key management message by the second device key, wherein the original key management message comprises an operation code and a key identity. Subsequently, the major management apparatus executes another step (not shown) of transmitting the key management message to the electronic apparatus. On the other hand, the electronic apparatus executes another step (not shown) of receiving the key management message from the major management apparatus. Subsequently, the electronic apparatus executes another step (not shown) of decrypting the key management message into the original key management message by the second device key. Then, the electronic apparatus executes another step (not shown) of selecting another application key according to the key identity. Finally, the electronic apparatus executes another step (not shown) of applying an operation corresponding to the operation code to the application key. The aforesaid original key management message may further comprise a key value so that the electronic apparatus applies the operation corresponding to the operation code to the application key according to the key value.

In addition to the aforesaid steps, the key management method of the ninth embodiment can also execute all the operations and functions set forth in the first to the fourth embodiments. How the ninth embodiment executes these operations and functions can be readily appreciated by those of ordinary skill in the art based on the explanation of the first to the fourth embodiments, and thus will not be further described herein.

A tenth embodiment of the present invention is a key management method, which is also suitable for use in a network system. The network system comprises a major management apparatus, an authorized management apparatus, and an electronic apparatus. The steps executed in the tenth embodiment are similar to those executed in the ninth embodiment except that the verification message of the steps S116, S117 and S128 and the verification procedure of the step S129 in the tenth embodiment are specialized. The following descriptions will be focused on the differences between the two embodiments. For convenience of understanding, please refer to FIG. 7A to FIG. 7B, FIG. 11A to FIG. 11C, and FIG. 12 in this embodiment.

Specifically, in this embodiment, the step S116 obtains a first verification pattern by executing a verification pattern operation by the authorization key, the first right token (i.e., the right token assigned by the major management apparatus), the right level, and a key operation message. It shall be appreciated that the key operation message comprises the operation code, the key identity, and the key value and the first verification pattern is the verification message. The step S117 transmits the first verification pattern to the electronic apparatus.

Furthermore, in this embodiment, the verification message received in the step S128 is the aforesaid first verification pattern. Next, referring to FIG. 12, a detailed flowchart of the step S129 is illustrated. Firstly, step S129a is executed to enable the electronic apparatus to generate a second right token by the right verification message, the right level, and the same hash function. Then, step S129b is executed to enable the electronic apparatus to obtain a second verification pattern by executing the same verification pattern operation by the authorization key, the second right token, the right level, and the key operation message. Subsequently, step S129c is executed to enable the electronic apparatus to determine whether the second verification pattern is the same as the received first verification pattern. If the second verification pattern is the same as the first verification pattern, then the step S126 will be executed. If the second verification pattern is different from the first verification pattern, then the electronic apparatus will end the key management method executed at this stage.

In addition to the aforesaid steps, the key management method of the tenth embodiment can also execute all the operations and functions set forth in the fifth embodiment. How the tenth embodiment executes these operations and functions can be readily appreciated by those of ordinary skill in the art based on the explanation of the fifth embodiment, and thus will not be further described herein.

An eleventh embodiment of the present invention is a key management method, which is also suitable for use in a network system. The network system comprises a major management apparatus, an authorized management apparatus, and an electronic apparatus. The steps executed in the eleventh embodiment are similar to those executed in the ninth embodiment except that the verification message of the steps S116, S117, and S128 and the verification procedure of the step S129 in the eleventh embodiment are specialized. The following descriptions will be focused on the differences between the two embodiments. For convenience of understanding, please refer to FIG. 9A to FIG. 9B, FIG. 11A to FIG. 11C, and FIG. 13 in this embodiment.

Specifically, in this embodiment, the step S116 obtains a first verification pattern by executing a verification pattern operation by the authorization key, the first right token (i.e., the right token assigned by the major management apparatus), and the key management message generated in the step S114. It shall be appreciated that the key operation message comprises the operation code, the key identity, and the key value and the first verification pattern is the verification message. The step S117 transmits the first verification pattern to the electronic apparatus.

Furthermore, in this embodiment, the verification message received in the step S128 is the aforesaid first verification pattern. Next, referring to FIG. 13, a detailed flowchart of the step S129 is illustrated. Firstly, step S129d is executed to enable the electronic apparatus to generate a second right token by the right verification message, the right level, and the same hash function. Then, step S129e is executed to enable the electronic apparatus to obtain a second verification pattern by executing the same verification pattern operation by the authorization key, the second right token, and the key management message. Subsequently, step S129f is executed to enable the electronic apparatus to determine whether the second verification pattern is the same as the received first verification pattern. If the second verification pattern is the same as the first verification pattern, then the step S126 will be executed. If the second verification pattern is different from the first verification pattern, then the electronic apparatus will end the key management method executed at this stage.

In addition to the aforesaid steps, the key management method of the eleventh embodiment can also execute all the operations and functions set forth in the seventh embodiment. How the eleventh embodiment executes these operations and functions can be readily appreciated by those of ordinary skill in the art based on the explanation of the seventh embodiment, and thus will not be further described herein.

A twelfth embodiment of the present invention is a key management method, which is also suitable for use in a network system. The network system comprises a major management apparatus, an authorized management apparatus, and an electronic apparatus. Similar to the tenth and the eleventh embodiments, the twelfth embodiment also additionally performs a verification mechanism. Nevertheless, the verification message of the twelfth embodiment is comprised in the key management message.

Figure 14A:
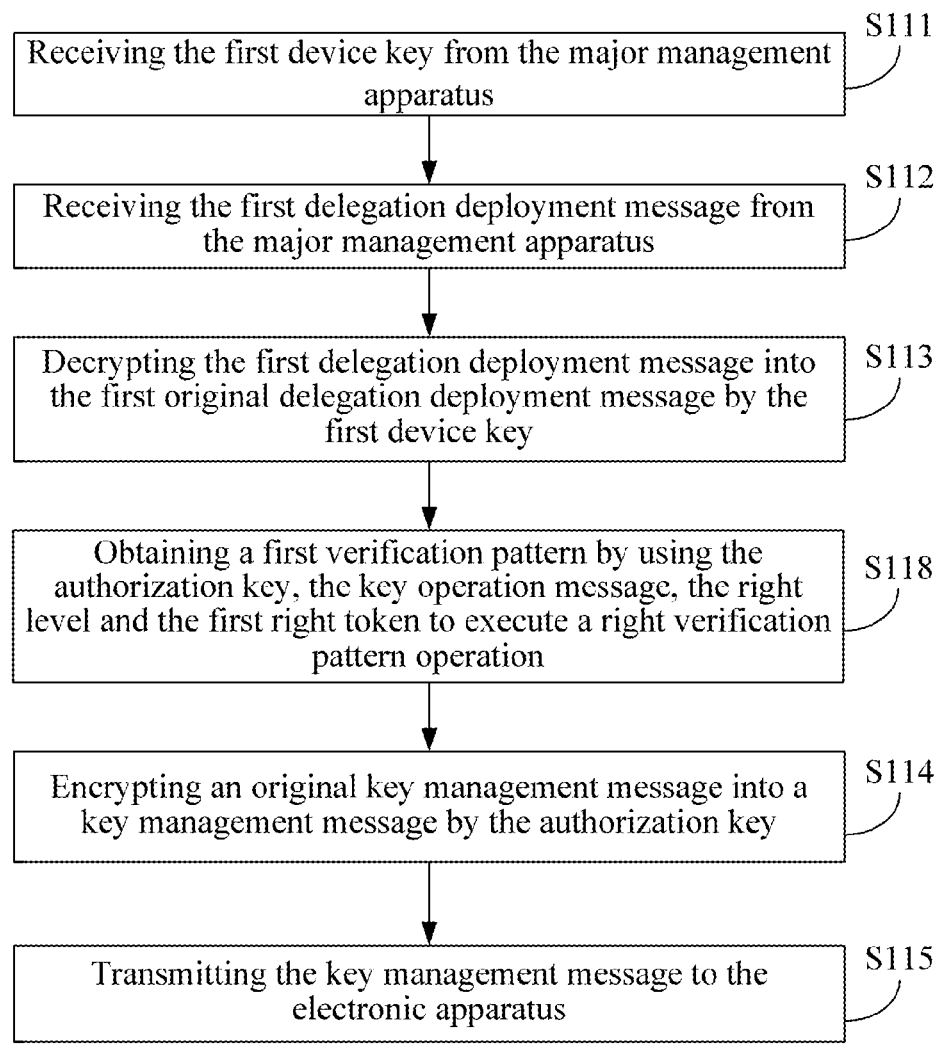
FIGS. 14A and 14B depict partial flowcharts of a key management method according to a twelfth embodiment.
Figure 14B:
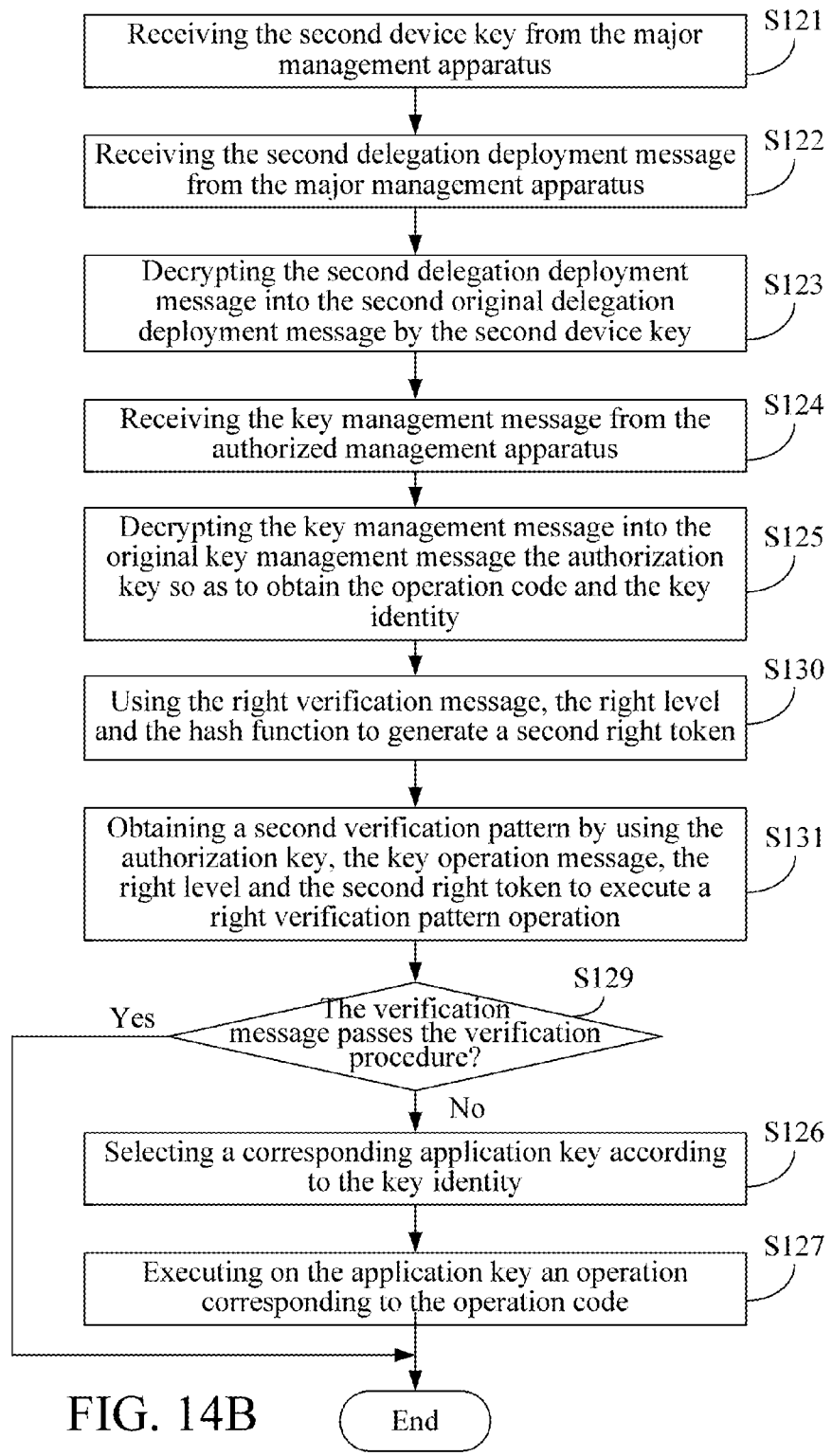

Referring to FIG. 10A, FIG. 14A, and FIG. 14B, flowcharts of the key management methods executed by the major management apparatus, the authorized management apparatus, and the electronic apparatus according to this embodiment. The process flow shown in FIG. 10A has been detailed above, so it will not be further described herein.

Referring to FIG. 14A, the authorized management apparatus executes the steps S111 to S113 firstly. Then, step S118 is executed to enable the authorized management apparatus to obtain a first verification pattern by executing a verification pattern operation by the authorization key, the key operation message, the right level, and the first right token (i.e., the right token assigned by the major management apparatus). Then, step S114 is executed to enable the authorized management apparatus to encrypt the original key management message into the key management message by the authorization key. In this embodiment, the original key management message comprises the key operation message, the right level, and the first verification pattern. Subsequently, the authorized management apparatus executes the step S115.

Referring to FIG. 14B, the electronic apparatus executes the steps S121 to S125 firstly. It shall be appreciated that, in the step S125, the electronic apparatus obtains the key operation message (which comprises the key identity, the operation code and the key value), the right level, and the first verification pattern after decrypting the key management message into the original key management message by the authorization key. Then, step S130 is executed to enable the electronic apparatus to generate a second right token by the right verification message, the right level, and the hash function. Then, step S131 is executed to enable the electronic apparatus to obtain a second verification pattern by executing a right verification pattern operation by the authorization key, the key operation message, the right level, and the second right token. Subsequently, step S129 is executed to enable the electronic apparatus to determine whether the verification message passes a verification procedure (specifically, determine whether the second verification pattern is the same as the first verification pattern). If the second verification pattern is the same as the first verification pattern (i.e. meaning that the verification message passes the verification procedure), then the step S126 will be executed subsequently. If the second verification pattern is different from the first verification pattern (i.e. meaning that the verification procedure is not passed), then the electronic apparatus will end the key management method executed at this stage.

In addition to the aforesaid steps, the key management method of the twelfth embodiment can also execute all the operations and functions set forth in the sixth embodiment. How the twelfth embodiment executes these operations and functions can be readily appreciated by those of ordinary skill in the art based on the explanation of the sixth embodiment, and thus will not be further described herein.

In addition, the key management method described in the eighth to the twelfth embodiments may be implemented by a computer program product. When the computer program product is loaded into the major management apparatus, the authorized management apparatus, and the electronic apparatus and a plurality of codes comprised therein is executed, the key management method described in the eighth to the twelfth embodiments can be accomplished. The aforesaid computer program product may be stored in a non-transitory tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 15:
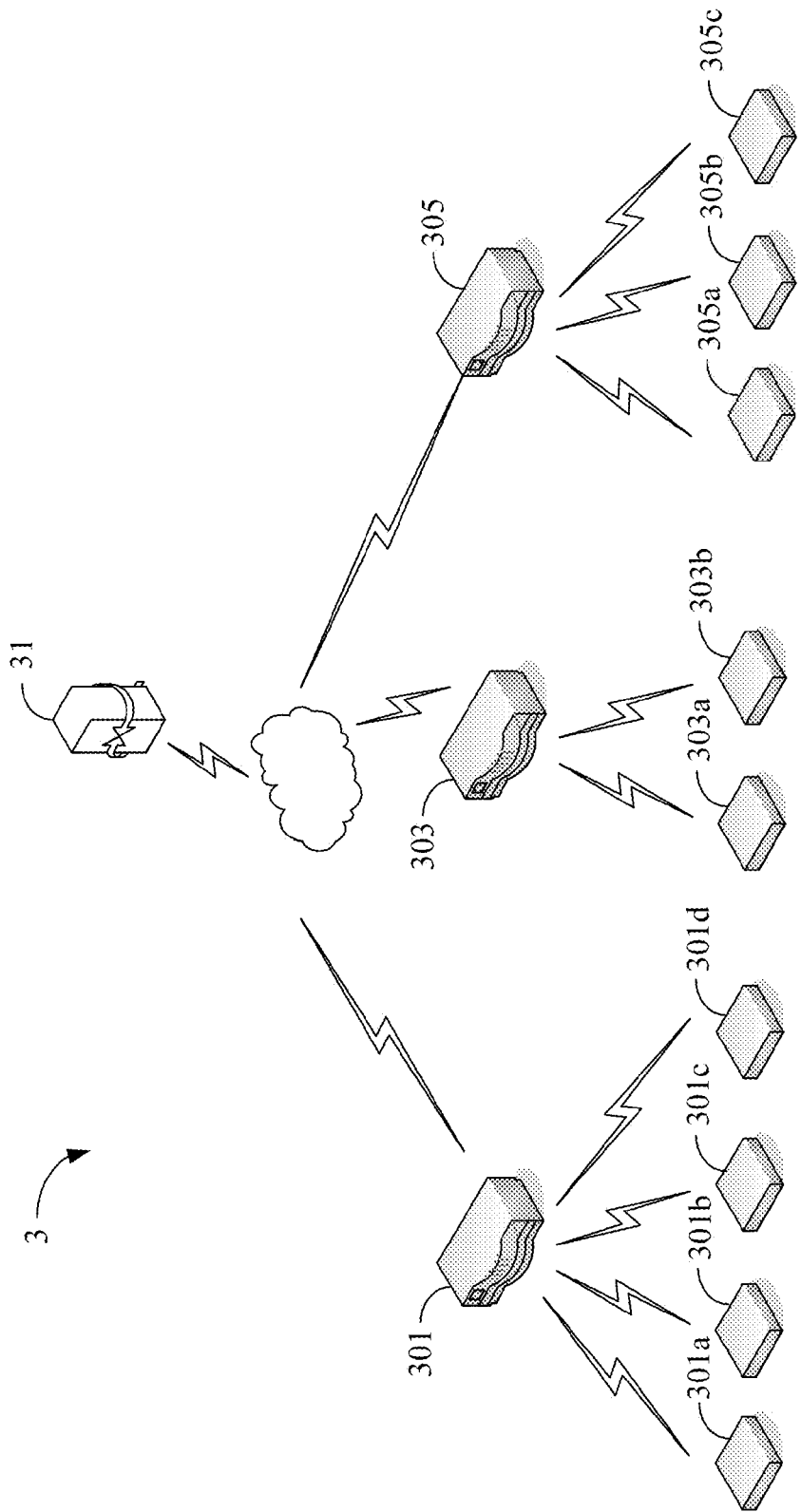
FIG. 15 depicts a schematic view of a network system 3 according to a thirteenth embodiment.

FIG. 15 depicts a schematic view of a network system 3 according to a thirteenth embodiment. A major management apparatus 31 is connected to three authorized management apparatuses 301, 303, 305 via the Internet. The authorized management apparatus 301 is connected to electronic apparatuses 301a, 301b, 301c, 301d, the authorized management apparatus 303 is connected to electronic apparatuses 303a, 303b, and the authorized management apparatus 305 is connected to electronic apparatuses 305a, 305b, 305c.

The network system 3 of this embodiment adopts a mixed key management mode; that is, a part of the network system 3 adopts a centralized key management mechanism while a part of the network system 3 adopts the delegating key management mechanism of the present invention. Specifically, application keys of the electronic apparatuses 301a, 301b, 301c, 301d are managed by the major management apparatus 31 directly and the authorized management apparatus 301 only forward signals between the major management apparatus 31 and the electronic apparatuses 301a, 301b, 301c. Management of application keys of the electronic apparatuses 303a, 303b is delegated to the authorized management apparatus 303 by the major management apparatus 31 according to the key management mechanism of the present invention.

For the electronic apparatuses 305a, 305b, 305c affiliated to the authorized management apparatus 305, different management ways are adopted. Application keys of the electronic apparatus 305a are managed by the major management apparatus 31 directly. Management of application keys of the electronic apparatus 305b is delegated to the authorized management apparatus 305 according to the key management mechanism of the present invention. For application keys of the electronic apparatus 305b, a part of the application keys are managed by the major management apparatus 31 directly and the management of the rest application keys are delegated to the authorized management apparatus 305 by the major management apparatus 31.

In this embodiment, when the major management apparatus 31 intends to manage the application keys of the electronic apparatuses, a processing unit of the major management apparatus 31 encrypts an original key management message into a key management message by a device key that is used between the major management apparatus 31 and the electronic apparatuses, wherein the original key management message comprises an operation code and a key identity. Then, a transceiving interface of the major management apparatus 31 transmits the key management message to the electronic apparatuses.

After the key management message is received by a transceiving interface of each of the electronic apparatuses, a processing unit of each of the electronic apparatuses decrypts the key management message into an original key management message by the device key, and thus obtains the operation code and the key identity. Subsequently, the processing unit of each of the electronic apparatuses selects one of the application keys according to the key identity, and applies an operation corresponding to the operation code to the selected application key. The aforesaid original key management message may further comprise a key value. In this case, the processing unit of each of the electronic apparatuses applies the operation corresponding to the operation code to the application key according to the key value.

As can be learned from this embodiment, depending on the overall resources of the network system 3, the application keys of some of the electronic apparatuses can be managed by the major management apparatus 31 directly, while managements of the application keys of some other electronic apparatuses are delegated to the respective authorized management apparatuses. Thus, the overall resources of the network system 3 can be used more efficiently.

As can be known from the above descriptions, key managements of the electronic apparatuses are delegated to the respective authorized management apparatuses by the major management apparatus. By doing so, the problems encountered by the prior art in key management including a too-long information transmission path, a too-large network data traffic, and a too-heavy workload of the major management apparatus can be solved. Furthermore, the present invention also provides a plurality of security control and verification mechanisms so that the delegating operations can be performed securely. If the major management apparatus intends to revoke the delegating operations, a corresponding mechanism is also provided to avoid information security problems derived from the delegating mechanism.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A major management apparatus for delegated key management, a network system comprising the major management apparatus, an authorized management apparatus, and an electronic apparatus, the major management apparatus comprising:
   a storage unit, being configured to store a first device key and a second device key;
   a transceiving interface, being configured to transmit the first device key to the authorized management apparatus and transmit the second device key to the electronic apparatus; and
   a processing unit, being electrically connected to the storage unit and the transceiving interface and configured to encrypt a first original delegation deployment message into a first delegation deployment message by the first device key and encrypt a second original delegation deployment message into a second delegation deployment message by the second device key;
   wherein the first original delegation deployment message comprises an authorization key, the second original delegation deployment message comprises the authorization key, and the transceiving interface further transmits the first delegation deployment message and the second delegation deployment message to the authorized management apparatus and the electronic apparatus respectively so that a right of managing an application key of the electronic apparatus is delegated from the major management apparatus to the authorized management apparatus in a way that the authorized management apparatus encrypts an original key management message into a key management message by the authorization key and
   the electronic apparatus decrypts the key management message received from the authorized management apparatus into the original key management message by the authorization key and operates the application key according to the original key management message.

2. The major management apparatus of claim 1, wherein the processing unit further generates a right token by a right verification message, a right level, and a hash function, the first original delegation deployment message further comprises the right level and the right token, and the second original delegation deployment message further comprises the right verification message.

3. The major management apparatus of claim 2, wherein the right level is a positive integer, the processing unit generates the right token by executing a predetermined times of the hash function on the right verification message, and the predetermined times is equal to the right level.

4. The major management apparatus of claim 1, wherein the storage unit further stores an access right message and the second original delegation deployment message further comprises the access right message.

5. The major management apparatus of claim 4, wherein the processing unit further generates a right token by a right verification message, a right calculation auxiliary message, a right level, and a hash function, the right calculation auxiliary message comprises one of an access right message, a device code associated with the electronic apparatus, and a combination thereof, the first delegation deployment message further comprises the right level and the right token, and the second delegation deployment message further comprises the right verification message.

6. The major management apparatus of claim 5, wherein the right level is a positive integer, the processing unit generates the right token by executing a predetermined times of the hash function on the right verification message and the right calculation auxiliary message, and the predetermined times is equal to the right level.

7. The major management apparatus of claim 1, wherein the processing unit further encrypts an original key management message into a key management message by the second device key, the original key management message comprises an operation code and a key identity, and the transceiving interface further transmits the key management message to the electronic apparatus so that the electronic apparatus applies an operation corresponding to the operation code to the application key.

8. The major management apparatus of claim 7, wherein the original key management message further comprises a key value so that the electronic apparatus applies the operation corresponding to the operation code to the application key according to the key value.

9. An authorized management apparatus for delegated key management, a network system comprising the authorized management apparatus, a major management apparatus, and an electronic apparatus, the authorized management apparatus comprising:
- a first transceiving interface, being configured to receive a device key and a delegation deployment message from the major management apparatus;
- a storage unit, being configured to store the device key;
- a processing unit, being electrically connected to the first transceiving interface and the storage unit, configured to decrypt the delegation deployment message into an original delegation deployment message by the device key so that a right of managing an application key of the electronic apparatus is delegated from the major management apparatus to the authorized management apparatus, and configured to encrypt an original key management message into a key management message by an authorization key comprised in the original delegation deployment message, wherein the original key management message comprises an operation code and a key identity; and
- a second transceiving interface being electrically connected to the processing unit and configured to transmit the key management message to the electronic apparatus so that the electronic apparatus decrypts the key management message into the original key management message by the authorization key and selects the application key according to the key identity and applies an operation corresponding to the operation code to the application key.

10. The authorized management apparatus of claim 9, wherein the original key management message further comprises a key value so that the electronic apparatus applies the operation corresponding to the operation code to the application key according to the key value.

11. The authorized management apparatus of claim 9, wherein the original delegation deployment message further comprises a right level and a right token, the original key management message further comprises the right level, the processing unit further generates a verification message related to the right level and the right token, and the second transceiving interface further transmits the verification message to the electronic apparatus so that the electronic apparatus performs a verification procedure according to the verification message.

12. The authorized management apparatus of claim 9, wherein the operation corresponding to the operation code is one of the establishment, updating, suspension, restoration, and revocation of the application key.

13. An electronic apparatus, a network system comprising the electronic apparatus, a major management apparatus, and an authorized management apparatus, the electronic apparatus comprising:
- a storage unit, being configured to store a first application key;
- a transceiving interface, being configured to receive a device key and a delegation deployment message from the major management apparatus; and
- a processing unit, being electrically connected to the storage unit and the transceiving interface and configured to decrypt the delegation deployment message into an original delegation deployment message by the device key so that a right of managing the first application key is delegated from the major management apparatus to the authorized management apparatus;
- wherein the storage unit further stores the device key, the transceiving interface further receives a first key management message from the authorized management apparatus, the processing unit further decrypts the first key management message into a first original key management message by an authorization key comprised in the original delegation deployment message, the first original key management message comprises a first operation code and a first key identity, the processing unit further selects the first application key according to the first key identity, and the processing unit further applies a first operation corresponding to the first operation code to the first application key.

14. The electronic apparatus of claim 13, wherein the first original key management message further comprises a key value, and the processing unit applies the first operation corresponding to the first operation code to the first application key according to the key value.

15. The electronic apparatus of claim 13, wherein the original delegation deployment message further comprises the right verification message, the first original key management message further comprises the right level, the transceiving interface further receives a verification message from the authorized management apparatus, and the processing unit further verifies the verification message according to the right verification message, the right level, and a hash function.

16. The electronic apparatus of claim 13, wherein the original delegation deployment message further comprises an access right message, and the processing unit further determines that the authorized management apparatus has a right of applying the first operation to the first application key by looking up the access right message according to the first operation code and the first key identity.

17. The electronic apparatus of claim 13, wherein the original delegation deployment message further comprises the right verification message, the first original key management message further comprises the right level, the transceiving interface further receives a verification message from the authorized management apparatus, and the processing unit further verifies the verification message according to the right verification message, a right calculation auxiliary message, the right level, and a hash function, and wherein the right calculation auxiliary message comprises one of an access right message, a device code associated with the electronic apparatus, and a combination thereof.

18. The electronic apparatus of claim 13, wherein the operation corresponding to the first operation code is one of the establishment, updating, suspension, restoration, and revocation of the first application key.

19. The electronic apparatus of claim 13, wherein the storage unit further stores a second application key, the transceiving interface further receives a second key management message from the major management apparatus, the processing unit further decrypts the second key management message into a second original key management message by the device key, the processing unit further selects the second application key according to the second key identity, and the processing unit further applies a second operation corresponding to a second operation code to the second application key.

20. The electronic apparatus of claim 19, wherein the second original key management message further comprises a key value and the processing unit further applies the second operation corresponding to the second operation code to the second application key according to the key value.

21. A key management method for a major management apparatus, a network system comprising the major management apparatus, an authorized management apparatus, and an electronic apparatus, the key management method comprising the steps of:
   (a) transmitting a first device key to the authorized management apparatus;
   (b) transmitting a second device key to the electronic apparatus;
   (c) encrypting a first original delegation deployment message into a first delegation deployment message by the first device key, wherein the first original delegation deployment message comprises an authorization key;
   (d) encrypting a second original delegation deployment message into a second delegation deployment message by the second device key, wherein the second original delegation deployment message comprises the authorization key; and
   (e) transmitting the first delegation deployment message and the second delegation deployment message to the authorized management apparatus and the electronic apparatus respectively so that a right of managing an application key of an electronic apparatus is delegated from the major management apparatus to the authorized management apparatus in a way that the authorized management apparatus encrypts an original key management message into a key management message by the authorization key and the electronic apparatus decrypts the key management message received from the authorized management apparatus into the original key management message by the authorization key and operates the application key according to the original key management message.

22. The key management method of claim 21, further comprising the step of:
   (g) generating a right token by a right verification message, a right level, and a hash function;
   wherein the first original delegation deployment message further comprises the right level and the right token, and the second original delegation deployment message further comprises the right verification message.

23. The key management method of claim 22, wherein the right level is a positive integer, the step (g) generates the right token by executing a predetermined time of the hash function on the right verification message, and the predetermined times is equal to the right level.

24. The key management method of claim 21, wherein the second original delegation deployment message further comprises the access right message.

25. The key management method of claim 24, further comprising the step of:
   (g) generating a right token by a right verification message, a right calculation auxiliary message, a right level, and a hash function;
   wherein the right calculation auxiliary message comprises one of an access right message, a device code associated with the electronic apparatus, and a combination thereof, the first delegation deployment message further comprises the right level and the right token, and the second delegation deployment message further comprises the right verification message.

26. The key management method of claim 25, wherein the right level is a positive integer, the step (g) generates the right token by executing a predetermined times of the hash function on the right verification message and the right calculation auxiliary message, and the predetermined times is equal to the right level.

27. The key management method of claim 21, further comprising the steps of:
   encrypting an original key management message into a key management message by the second device key, wherein the original key management message comprises an operation code and a key identity; and
   transmitting the key management message to the electronic apparatus so that the electronic apparatus applies an operation corresponding to the operation code to the application key.

28. The key management method of claim 27, wherein the original key management message further comprises a key value so that the electronic apparatus applies the operation corresponding to the operation code to the application key according to the key value.

29. A key management method for an authorized management apparatus, a network system comprising the authorized management apparatus, a major management apparatus, and an electronic apparatus, the key management method comprising the steps of:
   (a) receiving a device key from the major management apparatus;
   (b) receiving a delegation deployment message from the major management apparatus;
   (c) decrypting the delegation deployment message into an original delegation deployment message by the device key so that a right of managing an application key of the electronic apparatus is delegated from the major management apparatus to the authorized management apparatus;
   (d) encrypting an original key management message into a key management message by an authorization key comprised in the original delegation deployment message, wherein the original key management message comprises an operation code and a key identity; and
   (e) transmitting the key management message to the electronic apparatus so that the electronic apparatus decrypts the key management message into the original key management message by the authorization key and selects an application key according to the key identity and applies an operation corresponding to the operation code to the application key.

30. The key management method of claim 29, wherein the original key management message further comprises a key value so that the electronic apparatus applies the operation corresponding to the operation code to the application key according to the key value.

31. The key management method of claim 29, wherein the original delegation deployment message further comprises a right level and a right token, the original key management message further comprises the right level, and the key management method further comprising the steps of:
   (f) generating a verification message related to the right level and the right token; and
   (g) transmitting the verification message to the electronic apparatus so that the electronic apparatus performs a verification procedure according to the verification message.

32. The key management method of claim 29, wherein the operation corresponding to the operation code is one of the establishment, updating, suspension, restoration, and revocation of the application key.

33. A key management method for an electronic apparatus, a network system comprising the electronic apparatus, a major management apparatus, and an authorized management apparatus, and the electronic apparatus storing a first application key, the key management method comprising the steps of:
(a) receiving a device key from the major management apparatus;
(b) receiving a delegation deployment message from the major management apparatus;
(c) decrypting the delegation deployment message into an original delegation deployment message by the device key so that a right of managing the first application key is delegated from the major management apparatus to the authorized management apparatus;
(d) receiving a first key management message from the authorized management apparatus;
(e) decrypting the first key management message into a first original key management message by an authorization key comprised in the original delegation deployment message, wherein the first original key management message comprises a first operation code and a key identity;
(f) selecting the first application key according to the key identity; and
(g) applying a first operation corresponding to the first operation code to the first application key.

34. The key management method of claim 33, wherein the first original key management message further comprises a key value, and the step (g) applies the first operation corresponding to the first operation code to the first application key according to the key value.

35. The key management method of claim 33, wherein the original delegation deployment message further comprises the right verification message, the first original key management message further comprises the right level, and the key management method further comprising the steps of:
receiving a verification message from the authorized management apparatus; and
verifying the verification message according to the right verification message, the right level, and a hash function.

36. The key management method of claim 33, wherein the original delegation deployment message further comprises an access right message and the key management method further comprising the step of:
determining that the authorized management apparatus has a right of applying the first operation to the first application key by looking up the access right message according to the first operation code and the key identity.

37. The key management method of claim 33, wherein the original delegation deployment message further comprises the right verification message, the first original key management message further comprises the right level, and the key management method further comprising the steps of:
receiving a verification message from the authorized management apparatus; and
verifying the verification message according to the right verification message, a right calculation auxiliary message, the right level, and a hash function;
wherein the right calculation auxiliary message comprises one of an access right message, a device code associated with the electronic apparatus, and a combination thereof.

38. The key management method of claim 33, wherein the operation corresponding to the first operation code is one of the establishment, updating, suspension, restoration, and revocation of the first application key.

39. The key management method of claim 33, wherein the electronic apparatus further stores a second application key, the key management method further comprising the steps of:
(h) receiving a second key management message from the major management apparatus;
(i) decrypting the second key management message into a second original key management message by the device key;
(j) selecting the second application key according to the second key identity; and
(k) applying a second operation corresponding to the second operation code to the second application key.

40. The key management method of claim 39, wherein the second original key management message further comprises a key value, and the step (k) applies the second operation corresponding to the second operation code to the second application key according to the key value.

* * * * *